(12) United States Patent
Nishida et al.

(10) Patent No.: US 10,733,750 B2
(45) Date of Patent: Aug. 4, 2020

(54) OPTICAL CHARACTERISTICS MEASURING METHOD AND OPTICAL CHARACTERISTICS MEASURING SYSTEM

(71) Applicant: Otsuka Electronics Co., Ltd., Osaka (JP)

(72) Inventors: Yoshihiko Nishida, Hirakata (JP); Yoshi Enami, Hirakata (JP); Nobuyuki Inoue, Hirakata (JP)

(73) Assignee: Otsuka Electronics Co., Ltd., Osaka (JP)

( * ) Notice: Subject to any disclaimer, the term of this patent is extended or adjusted under 35 U.S.C. 154(b) by 7 days.

(21) Appl. No.: 16/172,462

(22) Filed: Oct. 26, 2018

(65) Prior Publication Data
US 2019/0139249 A1    May 9, 2019

(30) Foreign Application Priority Data

Nov. 6, 2017    (JP) .................. 2017-213964

(51) Int. Cl.
| | |
|---|---|
| *G06T 7/60* | (2017.01) |
| *G01J 3/02* | (2006.01) |
| *G01J 3/51* | (2006.01) |
| *G01J 3/28* | (2006.01) |
| *H04N 5/232* | (2006.01) |

(Continued)

(52) U.S. Cl.
CPC .............. *G06T 7/60* (2013.01); *G01J 3/0202* (2013.01); *G01J 3/0205* (2013.01); *G01J 3/027* (2013.01); *G01J 3/0213* (2013.01); *G01J 3/0235* (2013.01); *G01J 3/0267* (2013.01); *G01J 3/0289* (2013.01); *G01J 3/0291* (2013.01); *G01J 3/2823* (2013.01); *G01J 3/51* (2013.01); *G02B 5/20* (2013.01); *H04N 5/232* (2013.01); *H04N 5/23229* (2013.01); *G01J 2003/1213* (2013.01)

(58) Field of Classification Search
CPC ....................................................... G06T 7/60
See application file for complete search history.

(56) References Cited

U.S. PATENT DOCUMENTS

| | | |
|---|---|---|
| 8,896,823 B2 | 11/2014 | Enami |
| 8,982,341 B2 | 3/2015 | Enami |

(Continued)

FOREIGN PATENT DOCUMENTS

| | | |
|---|---|---|
| JP | 2001-289732 A | 10/2001 |
| JP | 2013-170974 | 9/2013 |

(Continued)

*Primary Examiner* — Christopher K Peterson
(74) *Attorney, Agent, or Firm* — Studebaker & Brackett PC

(57) ABSTRACT

An optical characteristics measuring method for measuring optical characteristics of a subject, the optical characteristics measuring method including: a step of acquiring one or more captured images including the subject, using an image capturing apparatus that is located at a predetermined distance from the subject, and is configured to be displaceable relative to the subject, while maintaining the predetermined distance; and a step of creating, based on the one or more captured images thus acquired, a virtual image including the subject and acquired from one or more analysis points each located at a position other than a position on a plane that includes the trajectory of the image capturing apparatus.

9 Claims, 17 Drawing Sheets
(1 of 17 Drawing Sheet(s) Filed in Color)

(51) Int. Cl.
    *G02B 5/20*     (2006.01)
    *G01J 3/12*     (2006.01)
    *G02B 26/02*     (2006.01)
    *G06T 15/00*     (2011.01)
    *G06T 7/55*     (2017.01)

(56) References Cited

U.S. PATENT DOCUMENTS

| | | |
|---|---|---|
| 9,127,832 B2 | 9/2015 | Shiraiwa et al. |
| 9,500,520 B2 | 11/2016 | Ohkubo et al. |
| 2004/0125205 A1* | 7/2004 | Geng ................. G01B 11/2509 348/142 |
| 2010/0295956 A1* | 11/2010 | Goto ................. H04N 5/23248 348/208.6 |
| 2012/0007971 A1* | 1/2012 | Schnitzer ............... G01N 21/87 348/61 |
| 2013/0214120 A1 | 8/2013 | Shiraiwa et al. |
| 2013/0265570 A1 | 10/2013 | Enami |
| 2014/0055779 A1 | 2/2014 | Enami |
| 2015/0260569 A1 | 9/2015 | Ohkubo et al. |
| 2016/0239720 A1 | 8/2016 | Enami et al. |

FOREIGN PATENT DOCUMENTS

| | | | |
|---|---|---|---|
| JP | 2013-217651 | A | 10/2013 |
| JP | 2014-041091 | A | 3/2014 |
| JP | 2014-115215 | A | 6/2014 |
| JP | 2016-151437 | A | 8/2016 |
| JP | 2016-151438 | A | 8/2016 |
| WO | 2014/020660 | A1 | 2/2014 |

\* cited by examiner

FIG. 7A
FIG. 7B
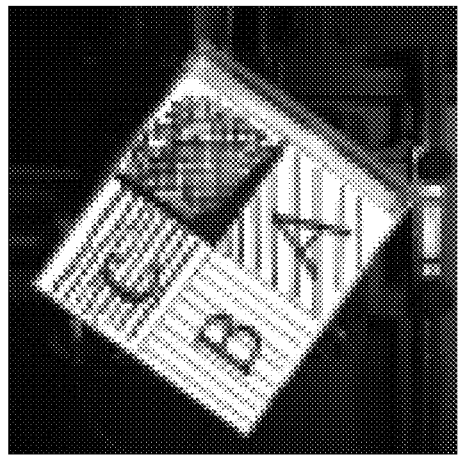
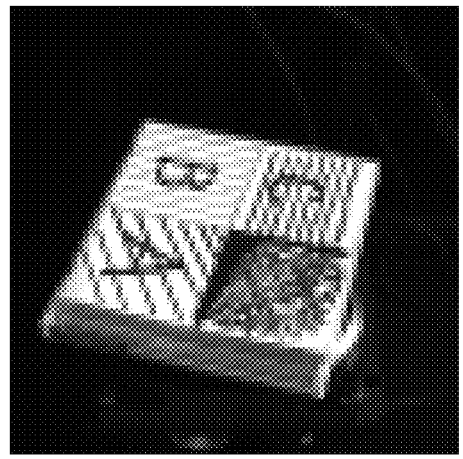

OPTICAL CHARACTERISTICS MEASURING METHOD AND OPTICAL CHARACTERISTICS MEASURING SYSTEM

CROSS-REFERENCE TO RELATED APPLICATION

This application is based upon and claims the benefit of priority from Japanese patent application No. 2017-213964, filed on Nov. 6, 2017, the disclosure of which are incorporated herein in its entirety by reference.

BACKGROUND OF THE INVENTION

Field of the Invention

The present invention relates to an optical characteristics measuring method and an optical characteristics measuring system for measuring optical characteristics of a subject.

Description of Related Art

Technology for measuring optical characteristics of a subject such as a light source has been developed. For example, JP 2016-151437A (Patent Document 1) discloses an apparatus that measures illuminance at a distance from a light source.

Specifically, the light distribution characteristics measuring apparatus disclosed in Patent Document 1 is a light distribution characteristics measuring apparatus for measuring light distribution characteristics of a light source, and includes: an image capturing unit that is located at a predetermined distance from the light source; a movable mechanism that continuously changes the position of the image capturing unit relative to the light source; and a processing unit that calculates light distribution characteristics of the light source based on a plurality of pieces of image data captured by the image capturing unit, and relative positions of the image capturing unit relative to the light source at points in time when the plurality of pieces of image data were respectively captured. The processing unit acquires a plurality of pieces of image data captured under first image capturing conditions and a plurality of pieces of image data captured under second image capturing conditions that are different from the first image capturing conditions. Also, based on first image information corresponding to a relative position of interest included in the plurality of pieces of image data captured under the first image capturing conditions, and second image information corresponding to the relative position of interest included in the plurality of pieces of image data captured under the second image capturing conditions, the processing unit determines corrected image information corresponding to the relative position of interest.

SUMMARY OF THE INVENTION

There is demand for technology that makes it possible to acquire more preferable measurement results, with a configuration for measuring optical characteristics of a subject, such as the light distribution characteristics measuring apparatus disclosed in Patent Document 1, using captured images of the subject.

The present invention has been made to solve the above-described problem, and an objective thereof is to provide an optical characteristics measuring method and an optical characteristics measuring system that can acquire more preferable measurement results with a configuration for measuring optical characteristics of a subject using captured images of the subject.

(1) An optical characteristics measuring method according to one aspect of the present invention is an optical characteristics measuring method for measuring optical characteristics of a subject, the optical characteristics measuring method including: a step of acquiring one or more captured images including the subject, using an image capturing apparatus that is located at a predetermined distance from the subject, and is configured to be displaceable relative to the subject, while maintaining the predetermined distance; and a step of creating, based on the one or more captured images thus acquired, a virtual image including the subject and acquired from one or more analysis points each located at a position other than a position on a plane that includes the trajectory of the image capturing apparatus.

The inventors of the present invention have conceived of measuring light that reaches the analysis points, from the viewpoint of what captured images can be acquired if images of the subject are captured from the analysis points, instead of simply measuring the intensity of light from the subject, at the analysis points. As described above, with the method of creating virtual images from the analysis points using an image captured from a point located at a position other than the analysis points, it is possible to reliably acquire a larger amount of information at various analysis points, compared to a method of simply measuring the intensity of light from the subject at an analysis point. Therefore, it is possible to acquire more preferable measurement results, with a configuration for measuring optical characteristics of the subject by using captured images of the subject.

(2) Preferably, in the step of creating a virtual image, a plurality of virtual images acquired from a plurality of analysis points are respectively created, and the optical characteristics measuring method further includes a step of calculating the sum of pixel values of each of the plurality of virtual images thus created.

With such a method, it is possible to calculate the light intensity for each analysis point. Therefore, it is possible to acquire the distribution of intensities of light on any plane with high accuracy.

(3) Preferably, in the step of creating a virtual image, a captured image is selected from among a plurality of images captured from the trajectory, based on a position on a virtual plane corresponding to the virtual image, the position of each of the one or more analysis points, and the plane, and the virtual image is created based on the captured image thus selected.

With such a method, it is possible to select an appropriate captured image for each position on the virtual plane according to the position on the virtual plane, the position of the analysis point, and the trajectory. Therefore, it is possible to create a virtual image with high accuracy.

(4) More preferably, in the step of creating a virtual image, a plurality of captured images are selected from among a plurality of images captured from the trajectory, and the virtual image is created based on one image created from the plurality of captured images thus selected.

With such a method, in a case where there is no captured image corresponding to a position on the virtual plane and the position of the analysis point, and captured from the trajectory, it is possible to select a plurality of appropriate images and create a virtual image with high accuracy.

(5) Preferably, in the step of acquiring one or more captured images, a plurality of image capturing apparatuses that respectively capture images with different wavelengths are used, and in the step of creating a virtual image, the virtual image is created for each of the plurality of image capturing apparatuses.

With such a method, it is possible to acquire, a plurality of captured images with a plurality of wavelengths captured at the same time, for example. Also, it is possible to acquire captured images with different wavelengths in parallel and shorten the image capturing period. Therefore, even if the intensity of light from the subject changes over time, it is possible to acquire preferable captured images without being significantly affected by such changes.

(6) More preferably, in the step of acquiring one or more captured images, a plurality of image capturing apparatuses that are arranged along the circumference of the same circle that is centered around the subject are used.

By arranging a plurality of image capturing apparatuses such that the distance between each image capturing apparatus and the subject is the same, it is possible to simplify computation processing when, for example, performing analysis using a plurality of virtual images respectively created for the plurality of image capturing apparatuses.

(7) More preferably, in the step of acquiring one or more captured images, positional information indicating the position of each pixel of the one or more images captured by the plurality of image capturing apparatuses is corrected.

With such a method, even if the position of the subject is different in each of the images captured by the plurality of image capturing apparatuses, it is possible to perform correction such that the position of the subject in each captured image is the same, and then generate a virtual image for each wavelength. Therefore, it is possible to acquire even more preferable measurement results.

(8) More preferably, in the step of acquiring one or more captured images, a plurality of image capturing apparatuses that respectively include light attenuation filters provided at positions in an image capturing direction are used.

With such a method, even if the light-transmission rates of the plurality of optical filters respectively provided in the plurality of image capturing apparatuses are different from each other, each image capturing apparatus can capture an image with an appropriate light intensity.

(9) An optical characteristics measurement system according to one aspect of the present invention is an optical characteristics measuring system that measures optical characteristics of a subject, the optical characteristics measuring system including: an information processing apparatus; an image capturing apparatus that is located at a predetermined distance from the subject; and a movable mechanism configured to be able to change the position of the image capturing apparatus relative to the subject while maintaining the predetermined distance. The information processing apparatus is configured to create a virtual image including the subject and acquired from one or more analysis points each located at a position other than a position on a plane that includes the trajectory of the image capturing apparatus, based on an image captured by the image capturing apparatus and including the subject.

The inventors of the present invention have conceived of measuring light that reaches the analysis points, from the viewpoint of what captured images can be acquired if images of the subject are captured from the analysis points, instead of simply measuring the intensity of light from the subject, at the analysis points. As described above, with a configuration that uses an image captured from a point located at a position other than the analysis points and is thereby able to create a virtual image acquired from the analysis point, it is possible to reliably acquire a larger amount of information at various analysis points, compared to a configuration that simply measures the intensity of light from the subject at an analysis point. Therefore, it is possible to acquire more preferable measurement results, with a configuration for measuring optical characteristics of the subject by using captured images of the subject.

(10) Preferably, the information processing apparatus is configured to create a plurality of virtual images acquired from a plurality of analysis points respectively, and calculate the sum of pixel values of each of the plurality of virtual images thus created.

With such a configuration, it is possible to calculate the light intensity for each analysis point. Therefore, it is possible to acquire the distribution of intensities of light on any plane with high accuracy.

(11) Preferably, the information processing apparatus is configured to select a captured image from among a plurality of images captured from the trajectory, based on a position on a virtual plane corresponding to the virtual image, the position of each of the one or more analysis points, and the plane, and create the virtual image based on the captured image thus selected.

With such a configuration, it is possible to select an appropriate captured image for each position on the virtual plane according to the position on the virtual plane, the position of the analysis point, and the trajectory. Therefore, it is possible to create a virtual image with high accuracy.

According to the present invention, it is possible to acquire more preferable measurement results, with a configuration for measuring optical characteristics of the subject by using captured images of the subject.

The foregoing and other objects, features, aspects and advantages of the present invention will become more apparent from the following detailed description of the present invention when taken in conjunction with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 7A illustrates an example of a virtual image that is created by the information processing apparatus according to the embodiment of the present invention.

FIG. 7B illustrates an example of a virtual image that is created by the information processing apparatus according to the embodiment of the present invention.

DETAILED DESCRIPTION OF THE INVENTION

Figure 1:
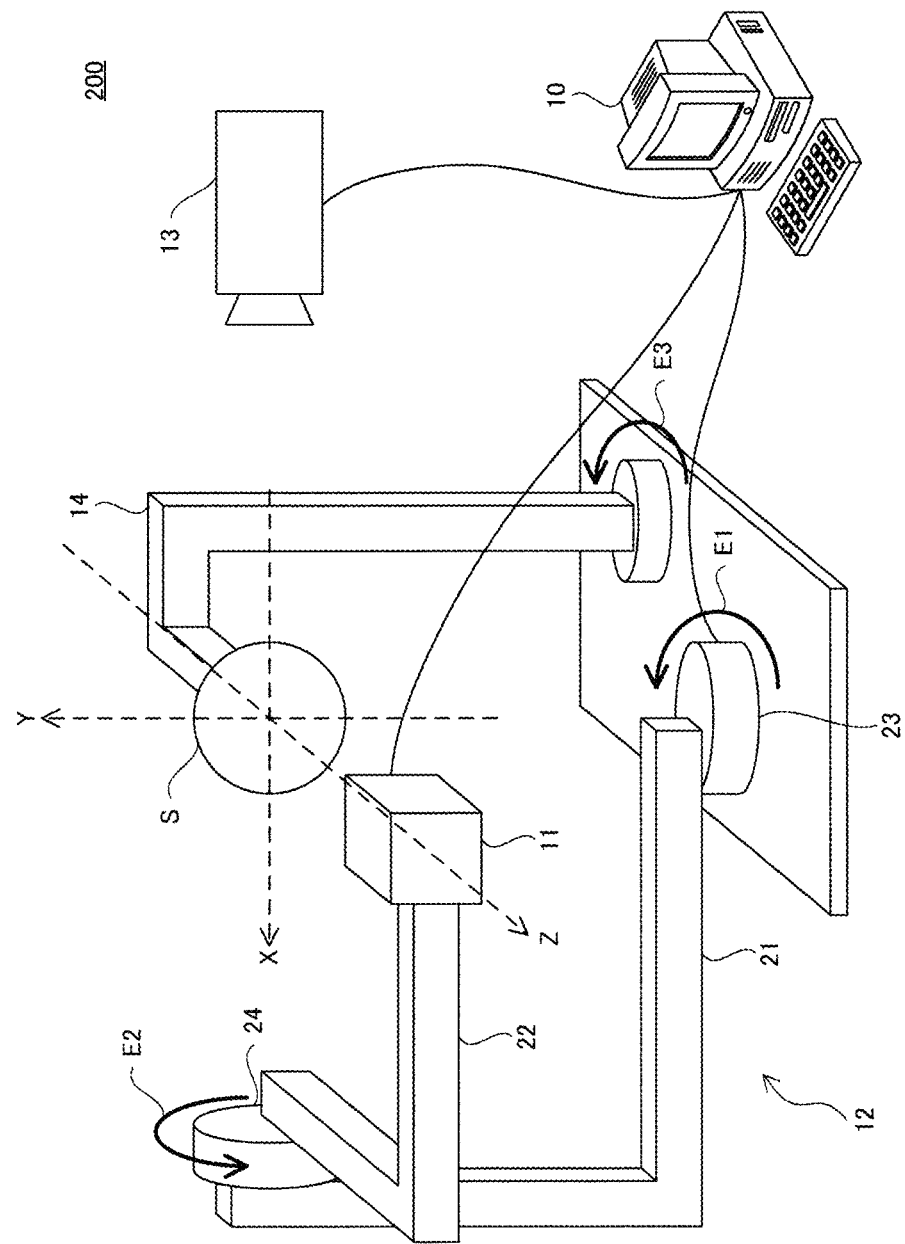
FIG. 1 shows an external configuration of an optical characteristics measuring system according to an embodiment of the present invention.

The following describes an embodiment of the present invention with reference to the drawings. Note that the same portions and equivalent portions in the drawings are assigned the same reference numerals and the descriptions thereof are not repeated. At least some portions of the embodiment below may be combined in any manner.

Configuration and Basic Operations
Optical Characteristics Measuring System

Figure 2:
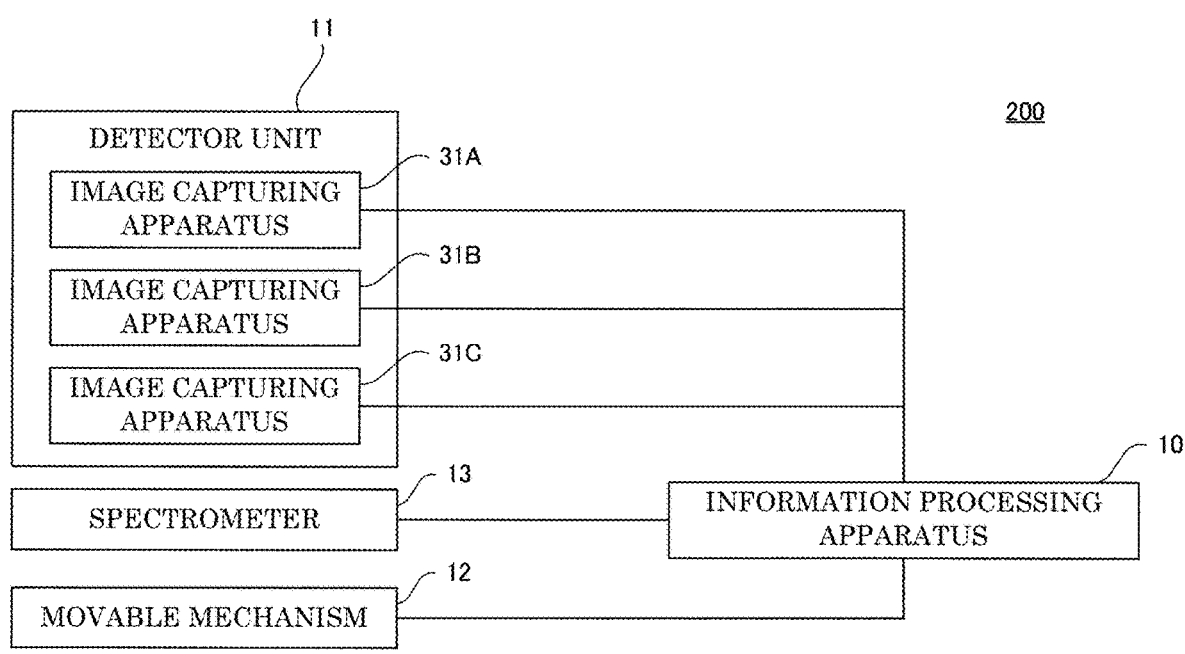
FIG. 2 shows an apparatus configuration of the optical characteristics measuring system according to the embodiment of the present invention.

FIG. 1 shows an external configuration of an optical characteristics measuring system according to an embodiment of the present invention. FIG. 2 shows an apparatus configuration of the optical characteristics measuring system according to the embodiment of the present invention.

As shown in FIGS. 1 and 2, an optical characteristics measuring system 200 is a system that measures optical characteristics of a subject S, and includes an information processing apparatus 10, a detector unit 11, a movable mechanism 12, a spectrometer 13, and a supporting platform 14 that supports the subject S.

The subject S is, for example, an object that emits light by itself, such as a light or a display device, or an object that reflects light from a light source or allows it to pass therethrough. Specifically, the subject S is, for example, a display such as a television, an indoor light, an outdoor light, an automotive light, or a film. Note that the shape of the subject S is not limited to the spherical shape shown in FIG. 1.

The detector unit 11 includes one or more image capturing apparatuses 31, specifically two-dimensional luminance meters. As shown in FIG. 2, the detector unit 11 includes three image capturing apparatuses 31A, 31B, and 31C that respectively capture images with different wavelengths. In the following description, each of the image capturing apparatuses 31A, 31B, and 31C may simply be referred to as an "image capturing apparatus 31". The image capturing apparatuses 31 are located at a predetermined distance from the subject S.

The movable mechanism 12 changes the position of the detector unit 11 relative to the subject S while maintaining the distance between the subject S and the detector unit 11. As shown in FIG. 1, the movable mechanism 12 includes a first arm 21, a second arm 22, a first motor 23 that can pivot in the direction indicated by an arrow E1, and a second motor 24 that can pivot in the direction indicated by an arrow E2.

As a result of the first motor 23 pivoting in the direction indicated by the arrow E1, the first arm 21 coupled to the first motor 23, the second arm 22 coupled to the first arm 21 via the second motor 24, and the detector unit 11 attached to the second arm 22 pivot in the direction indicated by the arrow E1. Also, as a result of the second motor 24 pivoting in the direction indicated by the arrow E2, the second arm 22 coupled to the second motor 24 and the detector unit 11 pivot in the direction indicated by the arrow E2.

Here, in FIG. 1, an axis that extends in a vertical direction is defined as a Y axis. Also, an axis that extends along a horizontal plane and extends in a direction from the subject S to the detector unit 11 when the detector unit 11 is located at the position shown in in FIG. 1 is defined as a Z axis. Also, an axis that extends along a horizontal plane and is orthogonal to the Z axis is defined as an X axis.

The information processing apparatus 10 is connected to the image capturing apparatuses 31A, 31B, and 31C, the movable mechanism 12, and the spectrometer 13. The information processing apparatus 10 transmits a measurement command to the spectrometer 13 via a LAN (Local Area Network) according to a user operation, for example. Upon receiving a measurement command from the information processing apparatus 10, the spectrometer 13 measures the spectrum of light from the subject S according to the measurement command, and transmits the measurement result to the information processing apparatus 10 via the LAN.

Also, the information processing apparatus 10 transmits a drive command to the first motor 23 and the second motor 24 of the movable mechanism 12 via the LAN according to a user operation, for example. Upon receiving the driving command from the information processing apparatus 10, the first motor 23 and the second motor 24 pivot according to the drive command.

Also, the information processing apparatus 10 transmits an image capture command to the image capturing apparatuses 31A, 31B, and 31C via a GigE (Gigabit Ethernet (registered trademark)) according to a user operation, for example. Upon receiving the image capture command from the information processing apparatus 10, the image capturing apparatuses 31A, 31B, and 31C respectively capture images that each include the subject S at the center, in parallel, e.g. at the same time, according to the image capture command, and transmit the captured images to the information processing apparatus 10 via the GigE.

Also, the information processing apparatus 10 performs processing that is described below, based on the measurement result from the spectrometer 13 and a plurality of captured images from the image capturing apparatuses 31A, 31B, and 31C, to analyze the optical characteristics of the subject S. For example, the information processing apparatus 10 calculates the light intensity at a given point Ap (hereinafter referred to as the "analysis point") that is located at a position other than a position on a plane that includes the trajectories of the image capturing apparatuses 31.

Specifically, the "position other than a position on a plane that includes the trajectories of the image capturing apparatuses 31" may be at least one of a position inside or outside the plane.

Detector Unit

Figure 3:
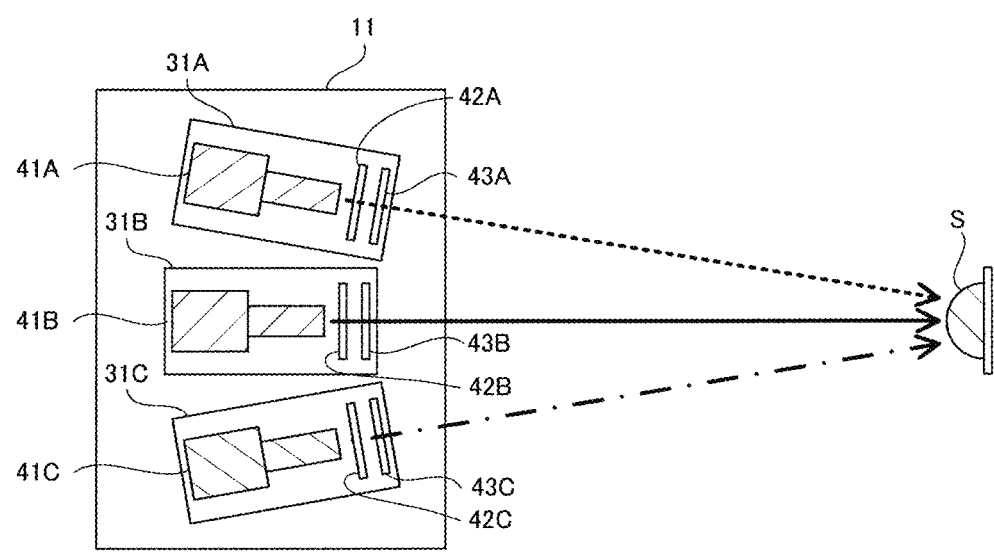
FIG. 3 shows a configuration of a detector unit according to the embodiment of the present invention.

FIG. 3 shows a configuration of the detector unit according to the embodiment of the present invention.

As shown in FIG. 3, the image capturing apparatuses 31A, 31B, and 31C in the detector unit 11 are arranged along the circumference of the same circle that is centered around the subject S, in the Y axis direction shown in FIG. 1. The image capturing apparatuses 31A, 31B, and 31C respectively include cameras 41A, 41B, and 41C, optical filters 42A, 42B, and 42C that are provided at positions in an image capturing direction, and light attenuation filters 43A, 43B, and 43C that are provided at positions in the image capturing direction. Note that the image capturing direction is a direction from the image capturing apparatuses 31 to the subject S, for example.

The optical filters 42A, 42B, and 42C respectively allow light with different wavelengths to pass therethrough. For example, the optical filter 42A allows light with a wavelength corresponding to the color red to pass therethrough, the optical filter 42B allows light with a wavelength corresponding to the color green to pass therethrough, and the optical filter 42C allows light with a wavelength corresponding to the color blue to pass therethrough. Note that the optical filters 42A, 42B, and 42C do not necessarily have characteristics that allow visible light to pass therethrough, and may have characteristics that allow infrared or ultraviolet light to pass therethrough.

Due to such optical filters 42A, 42B, and 42C being provided, and also due to the image capturing apparatuses 31A, 31B, and 31C capturing images of the subject S in parallel, the information processing apparatus 10 can acquire various kinds of images captured at the same time, for example. In other words, it is possible to shorten an image capturing period during which images are captured. Therefore, even if the light-emission intensity of the subject S changes over time, it is possible to acquire appropriate captured images without being significantly affected by changes in the light-emission intensity.

The three light attenuation filters 43A, 43B, and 43C respectively correspond to the optical filters 42A, 42B, and 42C, and adjust the amount of light such that light of an appropriate intensity reaches the corresponding optical filters 42A, 42B, and 42C. As described above, due to the configuration in which the light attenuation filters 43A, 43B, and 43C that are different from each other are respectively provided in the image capturing apparatuses 31, even if the light-transmission rates of the optical filters 42A, 42B, and 42C are different from each other, each image capturing apparatus 31 can capture an image with an appropriate light intensity.

Figure 4:
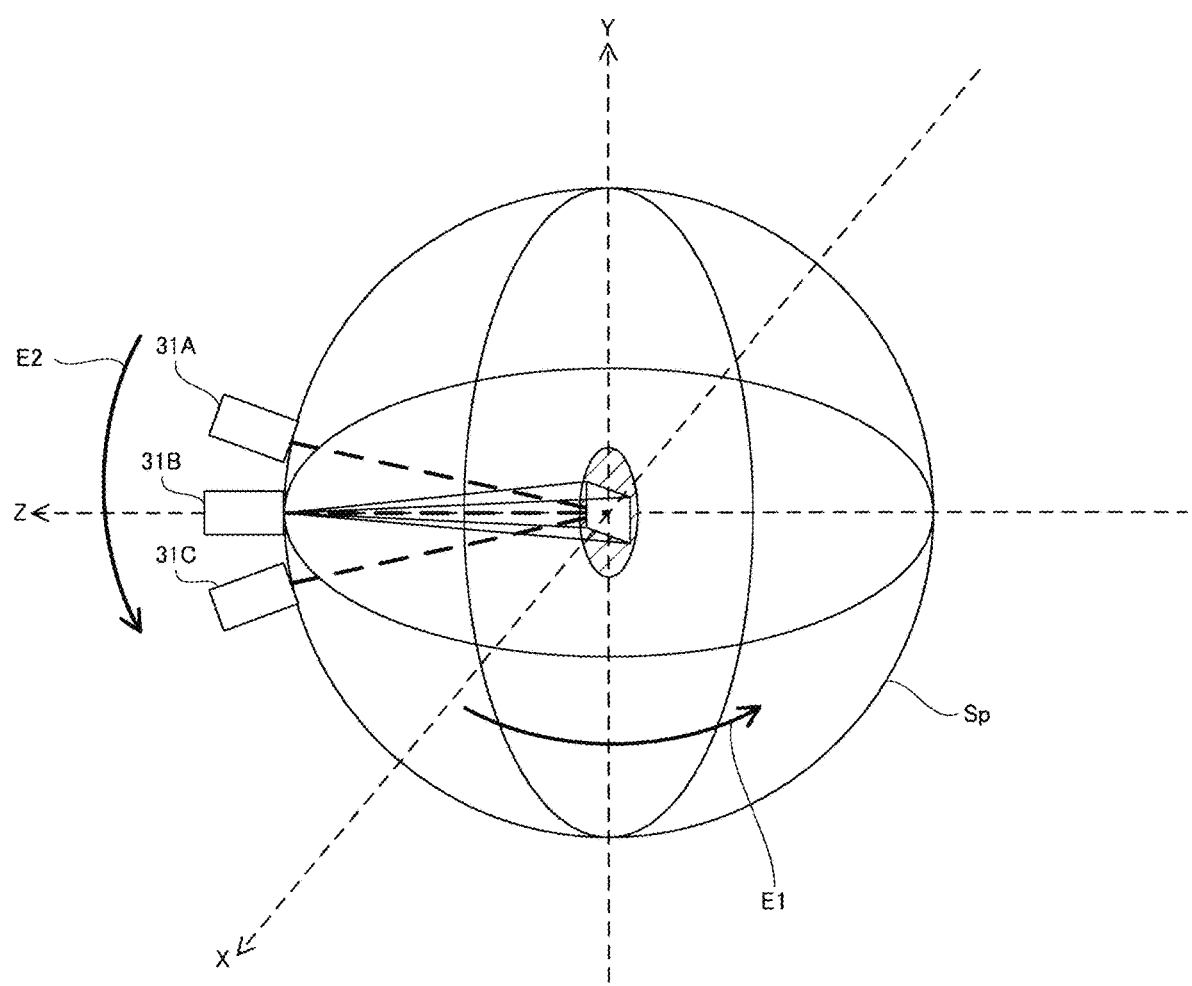
FIG. 4 illustrates changes in the positions of image capturing apparatuses according to the embodiment of the present invention.

FIG. 4 illustrates changes in the positions of the image capturing apparatuses according to the embodiment of the present invention.

FIGS. 1 and 4 are referenced here. As a result of the first motor 23 shown in FIG. 1 pivoting as described above, the detector unit 11 pivots about the subject S, in the direction indicated by the arrow E1. Also, as a result of the second motor 24 pivoting, the detector unit 11 pivots about the subject S, in the direction indicated by the arrow E2. In other words, as shown in FIG. 4, the image capturing apparatuses 31A, 31B, and 31C in the detector unit 11 move along a spherical plane Sp that is centered around the subject S.

More specifically, the moving angle of each image capturing apparatus 31 in the direction indicated by the arrow E1 is denoted as an angle $\varphi$, the moving angle of each image capturing apparatus 31 in the direction indicated by the arrow E2 is denoted as an angle $\theta$, and it is envisioned that the position of the image capturing apparatus 31B shown in FIG. 4 is a position defined by "the angle $\varphi=0°$" and "the angle $\theta=0°$" (hereinafter also referred to as the "initial position"). In this case, the image capturing apparatuses 31A, 31B, and 31C move along the spherical plane Sp, and accordingly the angle $\varphi$ and the angle $\theta$ of each image capturing apparatus change.

Here, it is envisioned that the information processing apparatus 10 transmits drive commands to the movable mechanism 12 so that the first motor 23 and the second motor 24 pivot in parallel. Consequently, it is unnecessary to stop the image capturing apparatuses 31 during the image capturing period in either the direction indicated by the arrow E1 or the direction indicated by the arrow E2. Thus, it is possible to prevent the image capturing apparatuses 31 from wobbling as a result of stopping. Also, since it is unnecessary to stop the image capturing apparatuses 31, the image capturing period can be short.

Figure 5:
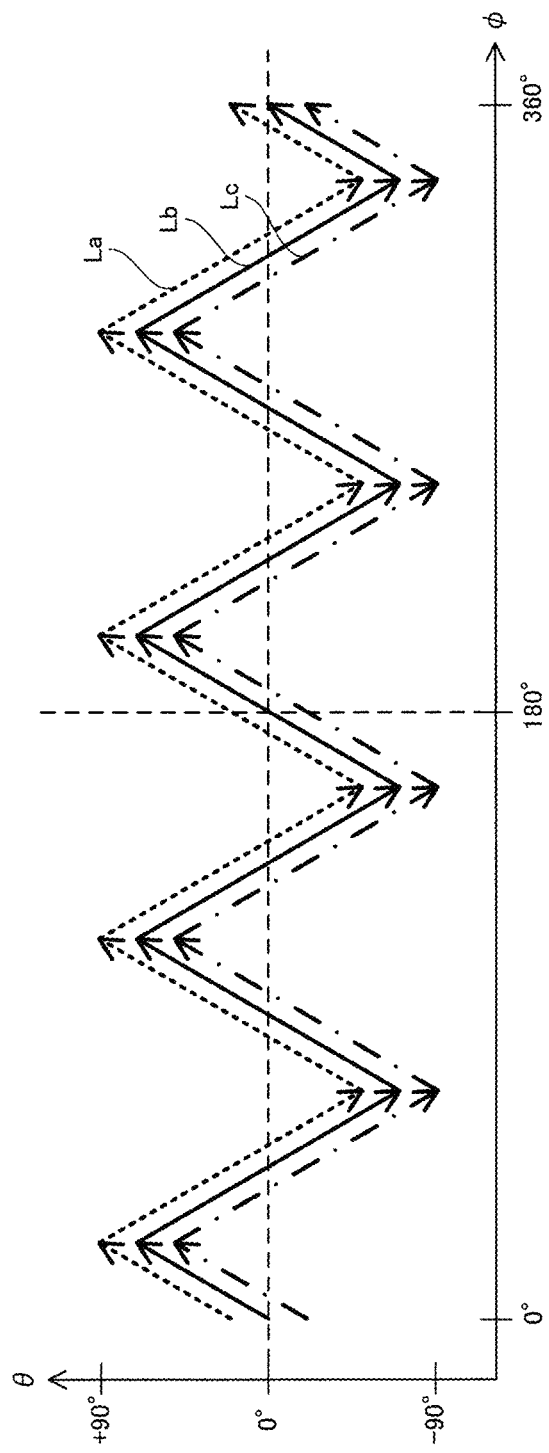
FIG. 5 illustrates trajectories of the image capturing apparatuses according to the embodiment of the present invention.

FIG. 5 illustrates trajectories of the image capturing apparatuses according to the embodiment of the present invention. In FIG. 5, the vertical axis indicates the moving angle $\theta$ of each image capturing apparatus 31, and the horizontal axis indicates the moving angle $\varphi$ of each image capturing apparatus 31.

As shown in FIG. 5, when the image capturing apparatuses 31A, 31B, and 31C move such that the angle $\varphi$ changes within a range defined by $0°\leq\varphi<360°$ and the angle $\theta$ changes within a range defined by $-90°\leq\theta<+90°$, a trajectory La of the image capturing apparatus 31A, a trajectory Lb of the image capturing apparatus 31B, and a trajectory Lc of the image capturing apparatus 31C are as shown in FIG. 5. The image capturing apparatuses 31A, 31B, and 31C, which are provided at physically different angles relative to the subject S, move while maintaining the positional relationship between one another in the detector unit 11. Therefore, the trajectories La, Lb, and Lc do not overlap each other.

Note that the trajectories La, Lb, and Lc are not limited to those shown in FIG. 5. Also, the image capturing apparatuses 31A, 31B, and 31C are not necessarily configured to move along the spherical plane Sp shown in FIG. 4. That is, a plane that includes the trajectories of the image capturing apparatuses 31 may have a shape that is different from a spherical shape.

Also, the information processing apparatus 10 may transmit drive commands to the movable mechanism 12 so that the first motor 23 and the second motor 24 are rotated one after the other.

Also, the image capturing apparatuses 31A, 31B, and 31C are not necessarily arranged along the circumference of the same circle that is centered around the subject S, in the Y axis direction shown in FIG. 1.

Also, the detector unit 11 may be configured without the light attenuation filters 43A, 43B, and 43C.

Analysis Processing Performed by Information Processing Apparatus

Calculation of Correction Coefficients

FIGS. 1 to 4 are referred to again. The information processing apparatus 10 receives the measurement result of the spectrum of light, from the spectrometer 13, and calculates a correction coefficient for each of the image capturing apparatuses 31, based on the measurement result thus received.

More specifically, the supporting platform 14 shown in FIG. 1 is pivotable in a direction indicated by an arrow E3. For example, the user rotates the supporting platform 14 to change the orientation of the subject S such that the spectrometer 13 is positioned in front of the subject S. In other words, the user changes the orientation of the subject S such that the positional relationship between the spectrometer 13 and the subject S is the same as the positional relationship between the image capturing apparatus 31 at the above-described initial position and the subject S. Thereafter, the information processing apparatus 10 transmits a measurement command to the spectrometer 13 according to a user operation.

Upon receiving a measurement command from the information processing apparatus 10, the spectrometer 13 measures the spectrum of light from the subject S according to the measurement command, and transmits the measurement result to the information processing apparatus 10. The information processing apparatus 10 receives the measurement result from the spectrometer 13, and acquires, for example, tristimulus values Xλ, Yλ, and Zλ of light from the subject S, based on the measurement result thus received.

Next, the user rotates the supporting platform 14 to change the orientation of the subject S such that the detector unit 11 is positioned in front of the subject S. Thereafter, for example, the information processing apparatus 10 transmits drive commands to the movable mechanism 12 according to a user operation so that the image capturing apparatuses 31A, 31B, and 31C move to the initial position one after another, and thus the information processing apparatus 10 changes the position of the detector unit 11.

Thereafter, the information processing apparatus 10 acquires an image captured by the image capturing apparatus 31A at the initial position, an image captured by the image capturing apparatus 31B at the initial position, and an image captured by the image capturing apparatus 31C at the initial position.

The information processing apparatus 10 also acquires the intensity of light of each color, based on the three captured images thus acquired. Specifically, the information processing apparatus 10 calculates the intensity of light with a wavelength corresponding to the color red, based on the image captured by the image capturing apparatus 31A from the initial position. The information processing apparatus 10 also calculates the intensity of light with a wavelength corresponding to the color green, based on the image captured by the image capturing apparatus 31B from the initial position. The information processing apparatus 10 also calculates the intensity of light with a wavelength corresponding to the color blue, based on the image captured by the image capturing apparatus 31C from the initial position.

Figure 6:
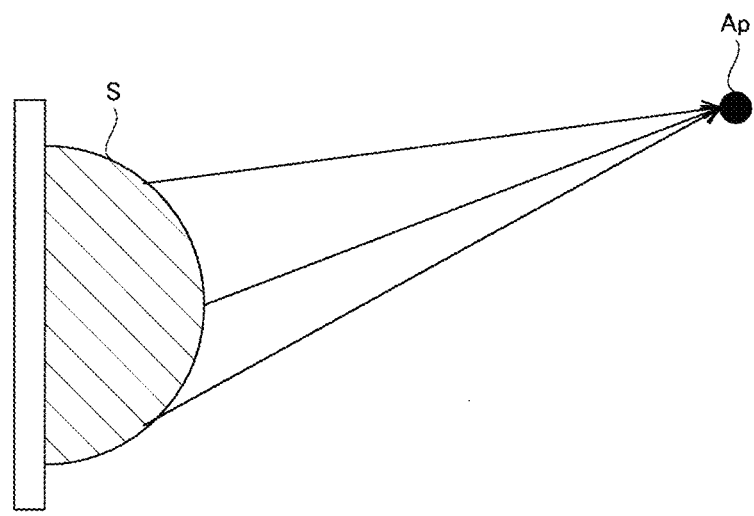
FIG. 6 illustrates processing that is performed by an information processing apparatus according to the embodiment of the present invention to calculate the light intensity.

FIG. 6 illustrates processing that is performed by the information processing apparatus according to the embodiment of the present invention to calculate the light intensity.

FIG. 6 is referenced here. When the intensities of light rays that reach an analysis point Ap from several points on the surface of the subject S are respectively denoted as intensities I0, I1, I2, and so on, the intensity of light that reaches the analysis point Ap is the sum of the intensities I0, I1, I2, and so on.

Therefore, the information processing apparatus 10 acquires the intensity of light corresponding to the color red by totaling the pixel values of a plurality of pixels that are included in the image captured by the image capturing apparatus 31A. The information processing apparatus 10 also acquires the intensity of light corresponding to the color green by totaling the pixel values of a plurality of pixels that are included in the image captured by the image capturing apparatus 31B. The information processing apparatus 10 also acquires the intensity of light corresponding to the color blue by totaling the pixel values of a plurality of pixels that are included in the image captured by the image capturing apparatus 31C.

Note that the information processing apparatus 10 may be configured to acquire the intensity of light of one color, based on a plurality of images respectively captured by the plurality of image capturing apparatuses 31. For example, the information processing apparatus 10 may be configured to acquire the intensity of light corresponding to the color red, based on an image captured by the image capturing apparatus 31A from the initial position and an image captured by the image capturing apparatus 31C from the initial position.

Thereafter, the information processing apparatus 10 calculates correction coefficients that are used to respectively equalize the intensities of light of the above-described colors acquired from the captured images with the tristimulus values Xλ, Yλ, and Zλ corresponding thereto acquired based on the measurement result from the spectrometer 13.

Virtual Image Creation

Based on images captured by the image capturing apparatuses 31, the information processing apparatus 10 performs computation processing to create one or more images (hereinafter referred to as the "virtual images") of the subject S virtually captured from one or more analysis points Ap each located at a position other than a position on the spherical plane Sp that includes the trajectories of the image capturing apparatuses 31.

FIGS. 7A and 7B each illustrate an example of a virtual image that is created by the information processing apparatus according to the embodiment of the present invention.

FIGS. 7A and 7B are referenced here. It is envisioned that a frontal image of the subject S, i.e. an image of the subject S captured from the initial position is the captured image shown in FIG. 7A. If this is the case, the information processing apparatus 10 performs computation processing to create a virtual image of the subject S virtually captured in an oblique direction relative to the subject S as shown in FIG. 7B, for example, i.e. virtually captured from an analysis point Ap located at a position that is different from the initial position.

Figure 8:
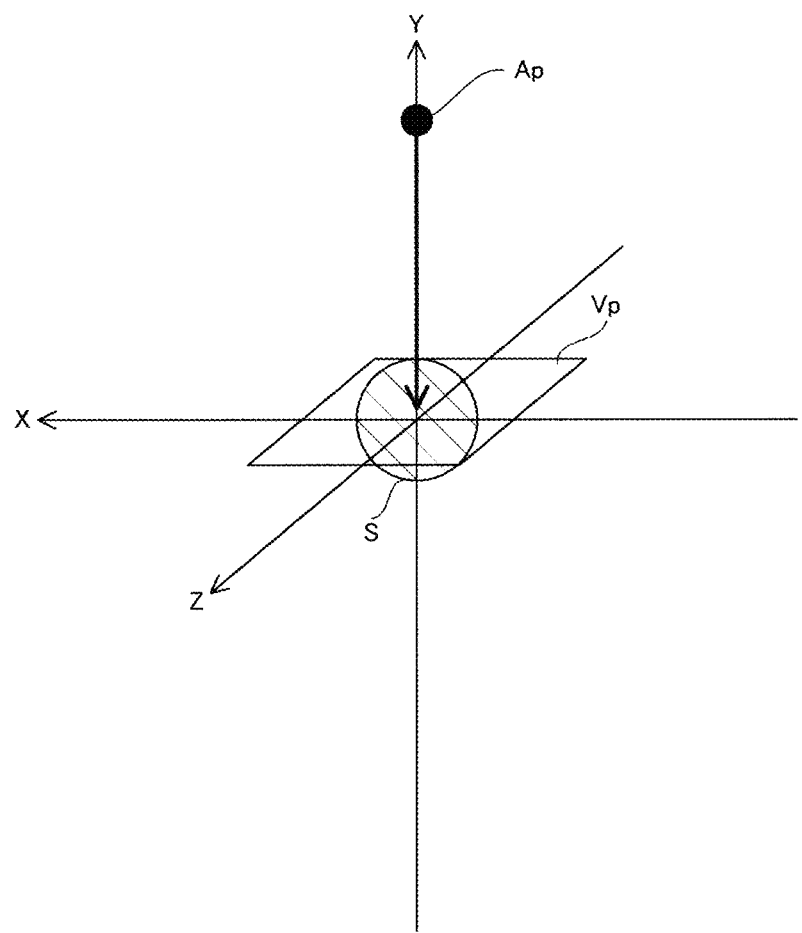
FIG. 8 illustrates a method for creating a virtual image, employed by the information processing apparatus according to the embodiment of the present invention.
Figure 9:
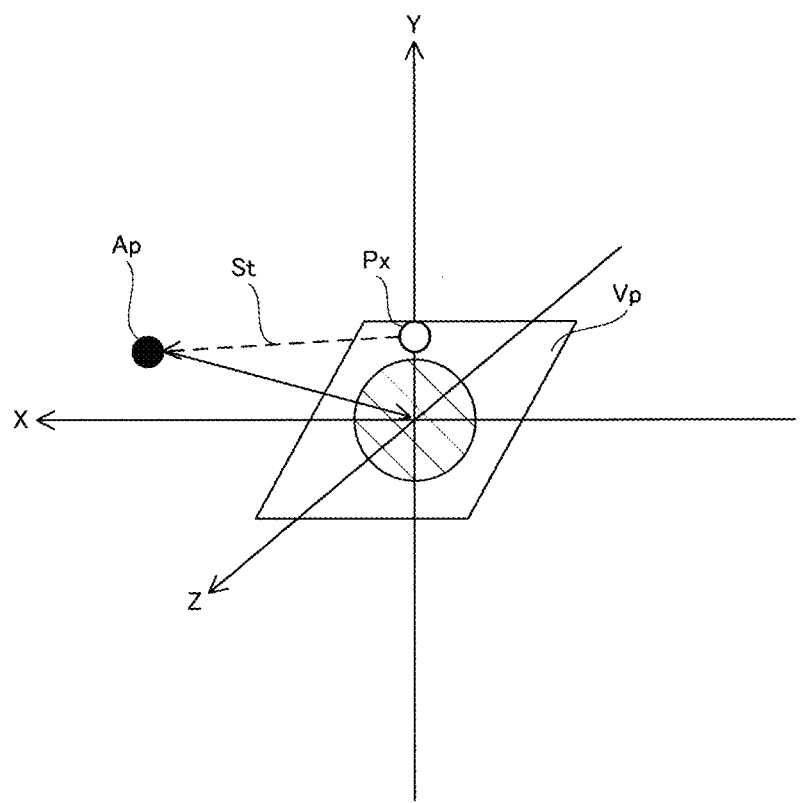
FIG. 9 illustrates a method for creating a virtual image, employed by the information processing apparatus according to the embodiment of the present invention.

FIG. 8 illustrates a method for creating a virtual image, employed by the information processing apparatus according to the embodiment of the present invention. FIG. 9 illustrates a method for creating a virtual image, employed by the information processing apparatus according to the embodiment of the present invention. In order to simply describe the method for creating a virtual image, the following describes one image capturing apparatus 31.

As shown in FIG. 8, it is envisioned that the analysis point Ap is located on the Y axis. If this is the case, the information processing apparatus 10 performs, as processing that is performed to create a virtual image captured from the analysis point Ap, an analysis on how the subject S is projected onto a plane (hereinafter referred to as the "virtual plane) Vp at the center of which the subject S is located and that is orthogonal to a vector extending from the analysis point Ap to the center of the subject S, and thus acquires a virtual image.

Also, as shown in FIG. 9, in a case where the analysis point Ap is not located on the Y axis, the information processing apparatus 10 similarly analyzes how the subject S is projected onto the virtual plane Vp corresponding to the analysis point Ap, and thus acquires a virtual image.

More specifically, the information processing apparatus 10 performs processing to analyze light from the subject S with respect to several points included in the virtual plane Vp. The following describes light analysis processing with respect to a point Px on the virtual plane Vp shown in FIG. 9.

Figure 10:
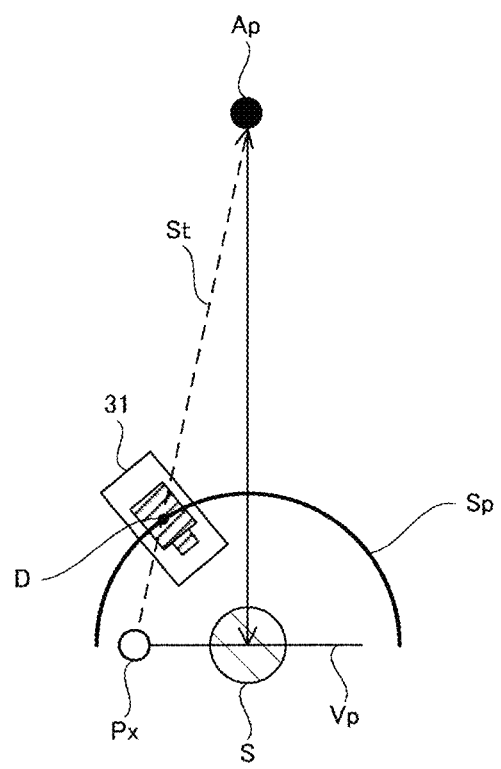
FIG. 10 illustrates light analysis processing with respect to a point Px shown in FIG. 9.

FIG. 10 illustrates light analysis processing with respect to the point Px shown in FIG. 9. FIG. 10 shows the respective positions of the subject S, the spherical plane Sp centered around the subject S shown in FIG. 4, and the analysis point Ap.

FIG. 10 is referenced here. The information processing apparatus 10 selects a captured image that is to be used to create a virtual image, from among a plurality of images captured by the image capturing apparatus 31, based on the position of the point Px on the virtual plane Vp, the position of the analysis point Ap, and the spherical plane Sp.

More specifically, the information processing apparatus 10 specifies a point D that is an intersection point of a straight line St and the spherical plane Sp, the straight line St passing through the point Px on the virtual plane Vp and the analysis point Ap. Thereafter, the information processing apparatus 10 selects an image captured by the image capturing apparatus 31 when the image capturing apparatus 31 was located at the point D, from among a plurality of captured images acquired by the image capturing apparatus 31.

Thereafter, the information processing apparatus 10 calculates pixel values of the virtual image, based on the pixel values, corresponding thereto, of the captured image thus selected, and thus creates the virtual image.

More specifically, the information processing apparatus 10 specifies the pixel value of the pixel corresponding to the point Px on the virtual plane Vp, from among the pixels included in the captured image thus selected.

The information processing apparatus 10 specifies the pixel values of all of the pixels included in the virtual image, and thus creates the virtual image. Thereafter, the information processing apparatus 10 performs output processing, which is processing performed to, for example, display the created virtual image, which is the result of analysis, on a monitor or the like, or transmit the created virtual image to another device.

Here, as shown in FIG. 5, the respective trajectories La, Lb, and Lc of the image capturing apparatuses 31A, 31B, and 31C do not overlap each other, and therefore the image capturing apparatuses 31A, 31B, and 31C cannot acquire an image captured from the same position. However, the information processing apparatus 10 performs computations using captured images to create a virtual image for each of the image capturing apparatuses 31A, 31B, and 31C, and thus the information processing apparatus 10 can create various kinds of images virtually captured from the same analysis point Ap.

Also, as described above, light rays with wavelengths corresponding to the colors red, green, and blue respectively reach the cameras 41A, 41B, and 41C shown in FIG. 3. Therefore, the information processing apparatus 10 can create a color virtual image by creating a virtual image acquired from the same analysis point Ap for each image capturing apparatus 31, and by using the virtual images thus created.

Note that the method for creating a virtual image employed by the information processing apparatus 10 is not limited to the above-described method, which is one example.

Compensation Processing

Here, there are cases where an image capturing apparatus 31 does not capture an image when located at the point D that is an intersection point of the straight line St and the spherical plane Sp shown in FIG. 10, the straight line St passing through the point Px in the virtual plane Vp and the analysis point Ap. In such cases, the information processing apparatus 10 can compensate for the image based on a plurality of images captured by the image capturing apparatuses 31.

Figure 11:
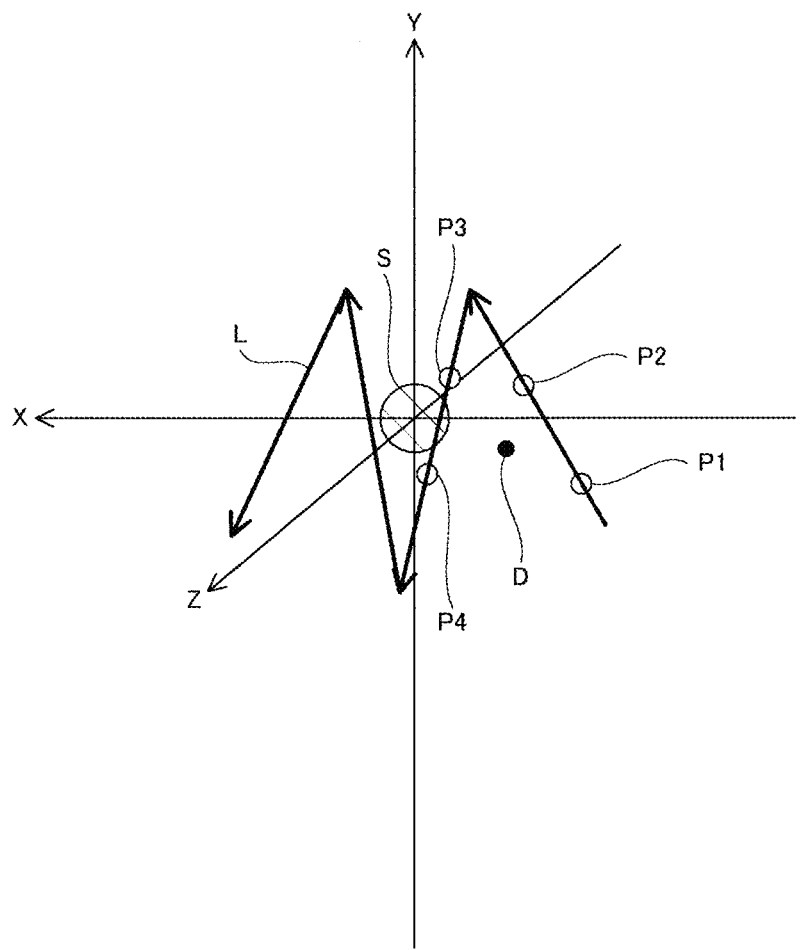
FIG. 11 illustrates compensation processing that is performed by the information processing apparatus according to the embodiment of the present invention.

FIG. 11 illustrates compensation processing that is performed by the information processing apparatus according to the embodiment of the present invention.

As shown in FIG. 11, the information processing apparatus 10 first selects a plurality of points that are included in a trajectory L and are located in the vicinity of the point D. Thereafter, the information processing apparatus 10 selects a plurality of images respectively captured from the plurality of points thus selected, from among a plurality of images captured by the image capturing apparatus 31. Thereafter, using the plurality of captured images thus selected, the information processing apparatus 10 creates one image that could be captured by the image capturing apparatus 31, assuming that the image capturing apparatus 31 was located at the point D.

For example, it is envisioned that the information processing apparatus 10 selects four points P1, P2, P3, and P4. If this is the case, the information processing apparatus 10 creates the aforementioned one image, using four images respectively captured from the four points P1, P2, P3, and P4 thus selected.

Light Intensity Calculation Processing

The information processing apparatus 10 may be configured to output the light intensity acquired based on the virtual image, as the result of analysis, instead of performing processing to output the created virtual image as the result of analysis.

The information processing apparatus 10 calculates the light intensity by totaling the pixel values of the plurality of pixels included in the captured image, and multiplies the light intensity thus calculated, by a correction coefficient. Thus, the information processing apparatus 10 can calculate the light intensity at the analysis point Ap. For example, the information processing apparatus 10 multiplies the sum of the pixel values acquired from an image captured by the image capturing apparatus 31A, by a correction coefficient corresponding to the color red. Thus, the information processing apparatus 10 can acquire a more accurate light intensity.

Also, the information processing apparatus 10 creates a virtual image for each of a plurality of analysis points Ap, and calculates the light intensity for each of the virtual images thus created. Thus, the information processing apparatus 10 can acquire the distribution of intensities of light on a plane that is located at any position at a distance from the subject S.

Figure 12:
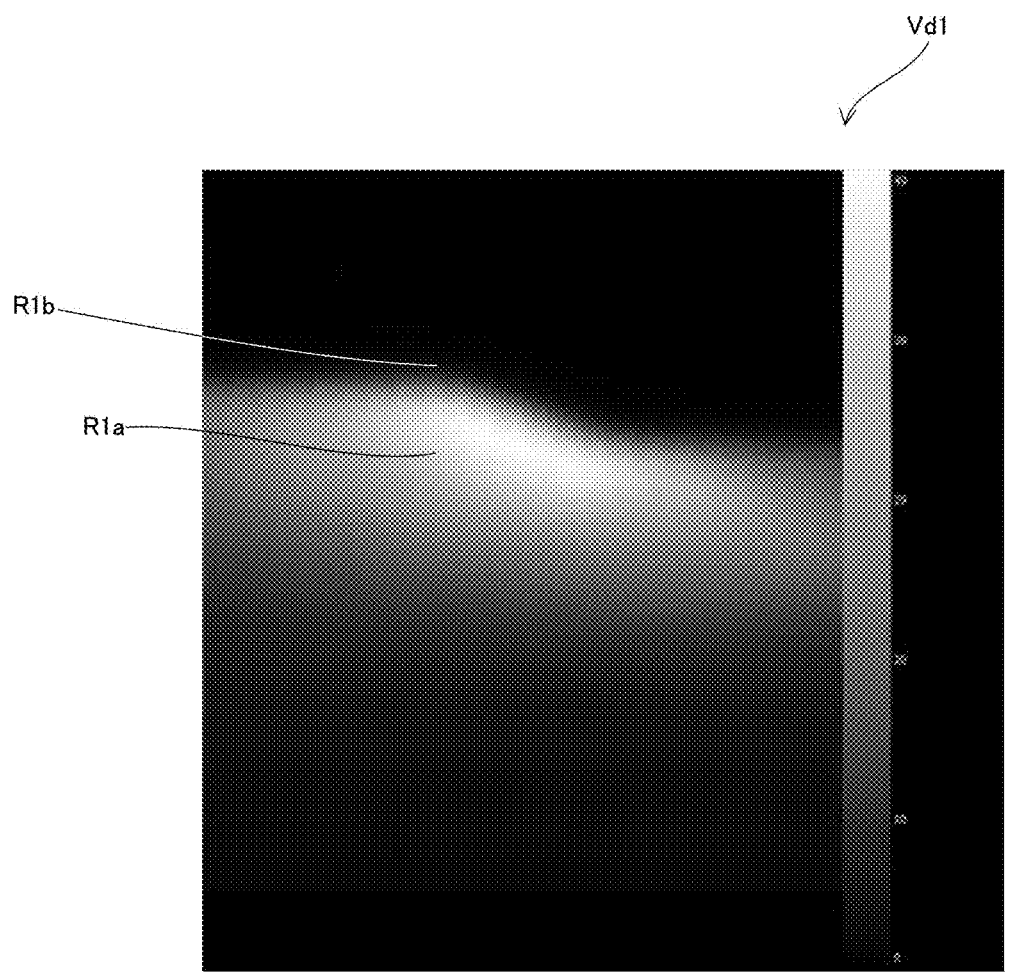
FIG. 12 shows an example of the distribution of intensities of light, which can be acquired through analysis processing that is performed by the information processing apparatus according to the embodiment of the present invention.

FIG. 12 shows an example of the distribution of intensities of light, which can be acquired through analysis processing that is performed by the information processing apparatus according to the embodiment of the present invention.

FIG. 12 is referenced here. The information processing apparatus 10 calculates the light intensity for each of a plurality of analysis points Ap included in a given plane, based on a plurality of images captured by the image capturing apparatus 31A, for example. Thus, the information processing apparatus 10 can acquire an image Vd1 that shows the distribution of intensities of light on the plane.

With such an image Vd1, it is easy to visually grasp, for example, the fact that the light intensity is high in an area R1a that is located near the center of the plane, and the light intensity is low in a peripheral area R1b.

Figure 13:
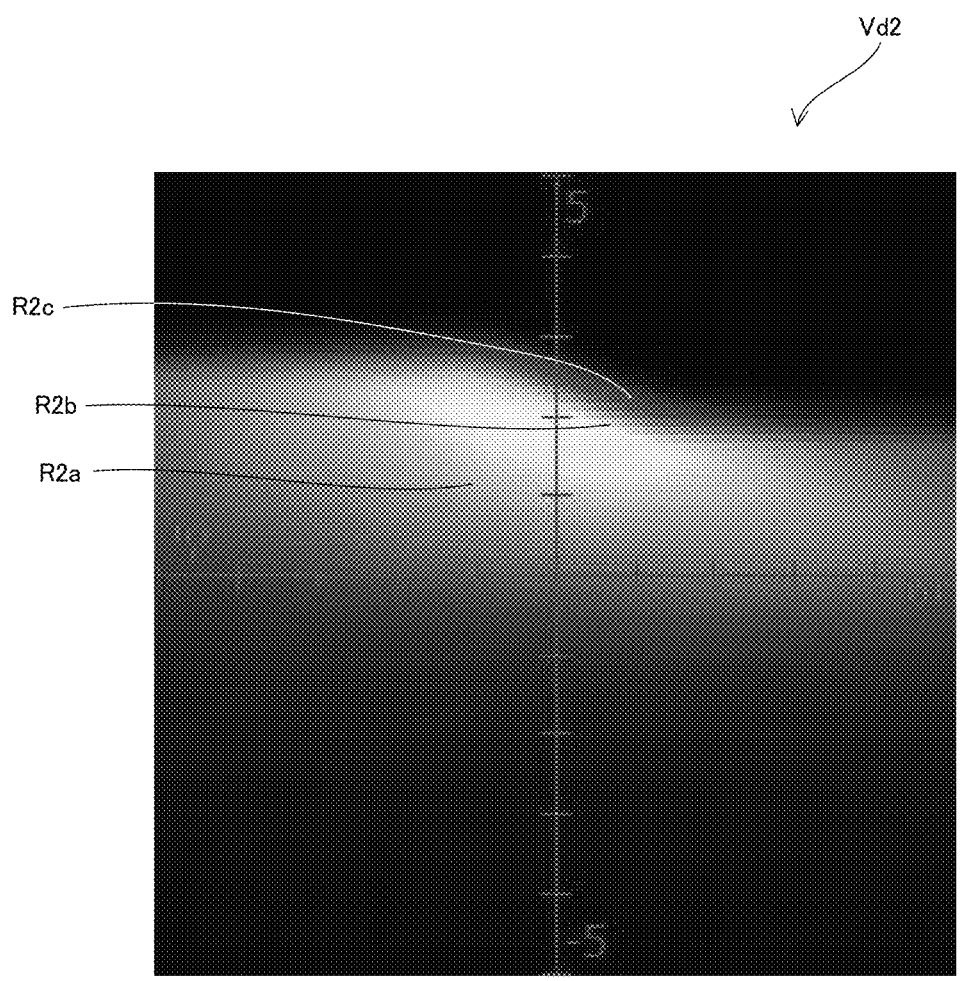
FIG. 13 shows an example of the distribution of intensities of light, which can be acquired through analysis processing that is performed by the information processing apparatus according to the embodiment of the present invention.

FIG. 13 shows an example of the distribution of intensities of light, which can be acquired through analysis processing that is performed by the information processing apparatus according to the embodiment of the present invention.

FIG. 13 is referenced here. The information processing apparatus 10 calculates the light intensity with respect to each of a plurality of analysis points Ap included in a given plane, based on a plurality of images captured by the image capturing apparatus 31A, a plurality of images captured by the image capturing apparatus 31B, and a plurality of images captured by the image capturing apparatus 31C, and thus can acquire a color image Vd2 that shows the distribution of intensities of light on the plane.

With such a color image Vd2, it is easy to visually grasp, for example, the fact that the intensity of light with a wavelength corresponding to the color green is high in an area R2a that is located near the center of the plane, and the intensity of light with a wavelength corresponding to the color yellow is high in an area R2b that is located slightly above the area R2a, and the intensity of light with a wavelength corresponding to the color red is high in an area R2c that is located slightly above the area R2b.

Note that the analysis points AP are not limited to points located at positions other than positions on the plane that includes the trajectories of the image capturing apparatuses 31, and may be any points located on the spherical plane Sp. Specifically, the information processing apparatus 10 may be configured to not determine whether or not an analysis point Ap is located on the spherical plane Sp of the image capturing apparatuses 31, and perform the same analysis processing regardless of whether the analysis point Ap is located on the spherical plane Sp or is located at a position other than a position on the spherical plane Sp. With such a configuration, analysis processing can be simplified.

Operational Flow

The information processing apparatus 10 includes a computer, and a computation processing unit such as a CPU in the computer reads out, from a memory (not shown), a program that includes part or all of the following steps of a flowchart, and executes the program. This program may be externally installed. In addition, this program is distributed in a state of being stored on a recording medium.

Figure 14:
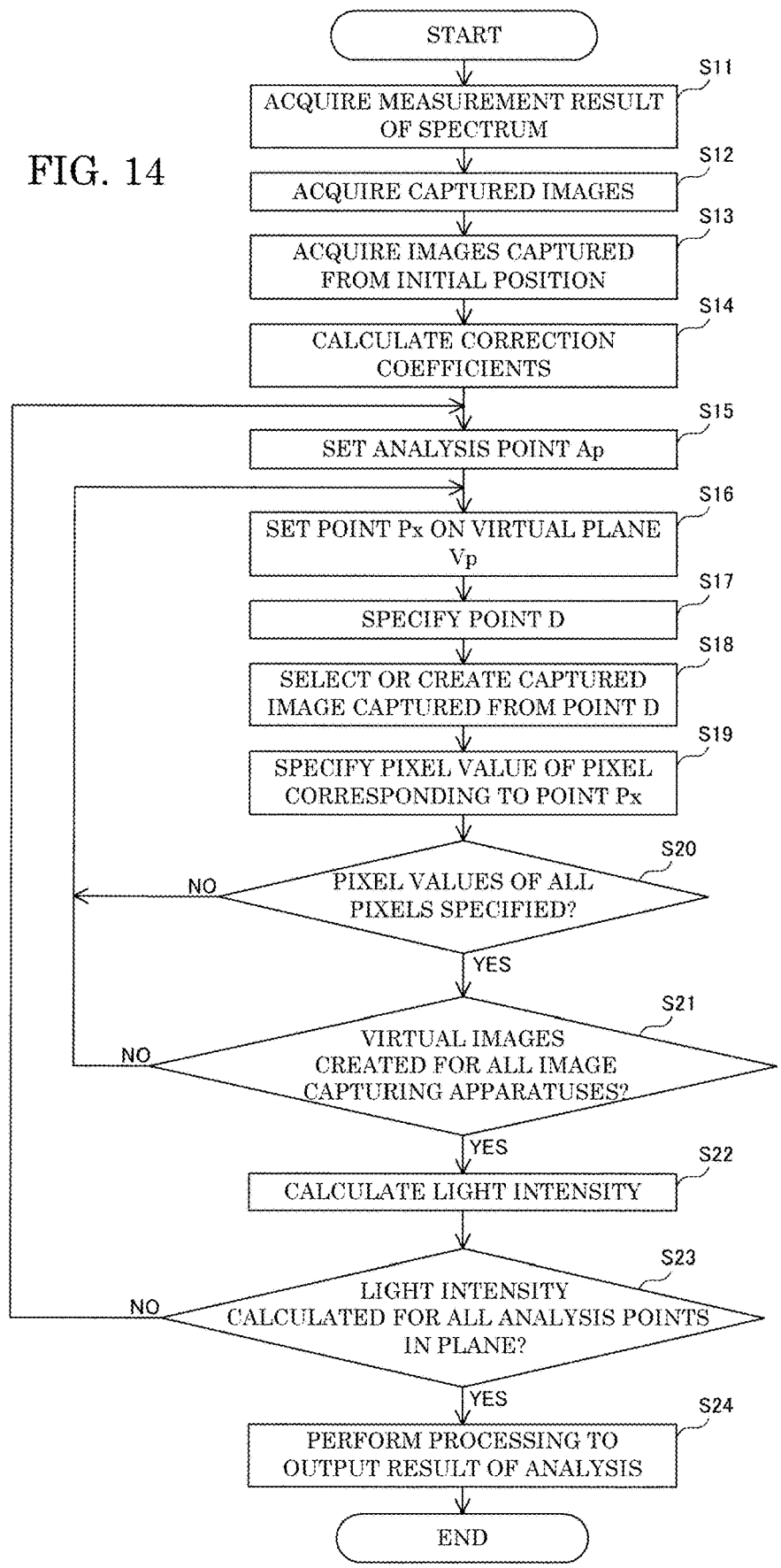
FIG. 14 is a flowchart showing a flow of operations that are performed by the information processing apparatus according to the embodiment of the present invention.

FIG. 14 is a flowchart showing a flow of operations that are performed by the information processing apparatus according to the embodiment of the present invention.

As shown in FIG. 14, first, the information processing apparatus 10 transmits a measurement command to the spectrometer 13. As a result, the spectrometer 13 measures spectrum. Thereafter, the information processing apparatus 10 acquires the measurement result transmitted from the spectrometer 13, and holds the measurement result thus acquired (step S11).

Next, the information processing apparatus 10 changes the position of the detector unit 11 and acquires a plurality of images captured by the image capturing apparatus 31A, a plurality of images captured by the image capturing apparatus 31B, and a plurality of images captured by the image capturing apparatus 31C, and hold the plurality of captured images thus acquired (step S12).

Next, for example, the information processing apparatus 10 acquires, from among the plurality of captured images thus acquired, an image captured by the image capturing apparatus 31A from the initial position, an image captured by the image capturing apparatus 31B from the initial position, and an image captured by the image capturing apparatus 31C from the initial position (step S13).

Next, the information processing apparatus 10 calculates three correction coefficients respectively corresponding to the colors red, green, and blue, based on the captured images thus acquired and the measurement result of the spectrum (step S14).

Note that the information processing apparatus 10 may acquire the measurement result of the spectrum (step S11) at a point in time between the acquisition of the captured images (step S12) and the acquisition of the images captured from the initial position (step S13), or between the acquisition of the images captured from the initial position (step S13) and the calculation of the correction coefficients (step S14).

Next, the information processing apparatus 10 sets an analysis point Ap according to a user operation. For example, it is envisioned that the user instructs the information processing apparatus 10 to output a color image showing the distribution of intensities of light on a given plane, as the result of analysis performed by the information processing apparatus 10. If this is the case, the information processing apparatus 10 sets one of a plurality of points included in the plane indicated by the user, as the analysis point Ap (step S15).

Next, the information processing apparatus 10 sets a point Px on the virtual plane Vp corresponding to the analysis point Ap (step S16).

Next, for example, the information processing apparatus 10 specifies the point D, which is an intersection point of the straight line St and the spherical plane Sp centered around the subject S, the straight line St passing through the point Px and the analysis point Ap thus set (step S17).

Next, the information processing apparatus 10 selects, for example, an image captured by the image capturing apparatus 31A when the image capturing apparatus 31A was located at the point D, from among the plurality of captured images held by the information processing apparatus 10. Note that, if the information processing apparatus 10 has not acquired an image captured by the image capturing apparatus 31A from the point D, the information processing apparatus 10 performs the above-described image compensation processing to create an image that could be captured by the image capturing apparatus 31A, assuming that the image capturing apparatus 31A was located at the point D (step S18).

Next, the information processing apparatus 10 specifies the pixel value of the pixel corresponding to the point Px on the virtual plane Vp, from among the pixels included in the captured image thus selected or created (step S19).

Next, the information processing apparatus 10 checks whether or not the information processing apparatus 10 has created a virtual image, i.e. whether or not the information processing apparatus 10 has specified the pixel values of all of the pixels included in the virtual image (step S20). If there is a pixel whose pixel value has not been specified ("NO" in step S20), the information processing apparatus 10 sets a new point Px corresponding to the pixel whose pixel value has not been specified (step S16), and performs step S17 and the subsequent processing.

On the other hand, if the information processing apparatus 10 has created a virtual image, i.e. if the information processing apparatus 10 has specified the pixel values of all of the pixels included in the virtual image ("YES" in step S20), the information processing apparatus 10 determines whether or not the information processing apparatus 10 has created virtual images corresponding to the analysis point Ap for all of the image capturing apparatuses 31A, 31B, and 31C (step S21).

If the information processing apparatus 10 has not created a virtual image for at least one of the image capturing apparatuses 31A, 31B, and 31C ("NO" in step S21), the information processing apparatus 10 performs virtual image creation processing, i.e. the processing in steps S16 to S20, with respect to the image capturing apparatus 31 for which a virtual image has not been created.

On the other hand, if the information processing apparatus 10 has created virtual images for all of the image capturing apparatuses 31A, 31B, and 31C ("YES" in step S21), the information processing apparatus 10 calculates, for each of the created virtual images, the sum of the pixel value of the plurality of pixels in the virtual image, and calculates a value by multiplying the sum by the correction coefficient, as the intensity of light. Thereafter, for example, using the plurality of intensities respectively calculated for the plurality of virtual images, the information processing apparatus 10 calculates the light intensity at the analysis point Ap for each wavelength (step S22).

Next, the information processing apparatus 10 checks whether or not the information processing apparatus 10 has calculated the light intensity for all of the points included in the plane specified by the user (step S23). If there is a point for which the light intensity has not been calculated ("NO" in step S23), the information processing apparatus 10 sets a new analysis point AP (step S15), and performs step S16 and the subsequent processing.

On the other hand, if the information processing apparatus 10 has calculated the light intensity for all of the points included in the plane specified by the user ("YES" in step S23), the information processing apparatus 10 creates, for example, a color image showing the distribution of intensities of light, based on the light intensity calculated for each point. Thereafter, the information processing apparatus 10 performs processing to output the image thus created, as the result of analysis (step S24).

Note that the user may specify, on the information processing apparatus 10, any type of data as data that is to be output from the information processing apparatus 10 as the result of analysis, according to the type of subject S, for example.

For example, it is envisioned that the user instructs the information processing apparatus 10 to output a color virtual image acquired from the analysis point Ap. If this is the case, the information processing apparatus 10 does not perform the processing in step S22 or S23, creates a color virtual image using three virtual images respectively corresponding to the image capturing apparatuses 31A, 31B, and 31C, and outputs the color virtual image thus created, as the result of analysis.

Also, it is envisioned that the user instructs the information processing apparatus 10 to output a virtual image acquired from the analysis point Ap and corresponding to the image capturing apparatus 31A, for example. If this is the case, the information processing apparatus 10 does not perform the processing in steps S21 to S23, and outputs a virtual image corresponding to the image capturing apparatus 31A as the result of analysis.

Also, it is envisioned that the user instructs the information processing apparatus 10 to output an image showing the distribution of intensities of light with a wavelength corresponding to the color red, on a given plane. If this is the case, the information processing apparatus 10 does not perform the processing in step S21 or S23, and creates an image showing the distribution of intensities of light, based on the light intensity at each of the plurality of analysis points Ap, which can be acquired from the virtual image corresponding to the image capturing apparatus 31A. Thereafter, the information processing apparatus 10 outputs the image thus created, as the result of analysis.

Note that the spectrometer 13 may be located inside the spherical plane Sp in order to improve sensitivity, for example. That is, the distance between the spectrometer 13 and the subject S may be different from the distance between the image capturing apparatuses 31 and the subject S.

If this is the case, when acquiring images captured from the initial position (step S13), the information processing apparatus 10 creates a virtual image acquired from the analysis point Ap, assuming that the spectrometer 13 is located at the analysis point Ap, based on the plurality of captured images thus acquired.

That is, the information processing apparatus 10 sets the position of the spectrometer 13 as the analysis point Ap, and sets the point Px on the virtual plane Vp corresponding to the analysis point Ap. Thereafter, the information processing apparatus 10 selects, from among the images captured by the image capturing apparatuses 31, an image captured from the point D, which is an intersection point of the straight line St and the spherical plane Sp, the straight line St passing through the point Px and the analysis point Ap.

Thereafter, the information processing apparatus 10 specifies the pixel value of the pixel corresponding to the point Px on the virtual plane Vp, from among the pixels included in the captured image thus selected. The information processing apparatus 10 specifies the pixel values of all of the pixels included in the virtual image, and thus the information processing apparatus 10 can create the virtual image corresponding to the analysis point Ap as an image captured from the initial position.

The information processing apparatus 10 is not necessarily configured to calculate a correction coefficient, and may be configured to not calculate a correction coefficient when the characteristics of the subject S are known, such as when the relative intensity of light at each wavelength is known. That is, the information processing apparatus 10 may not perform the acquisition of the result of spectrum measurement (step S11), the acquisition of the image captured from the initial position (step S13), or the calculation of the correction coefficient (step S14). Also, if this is the case, the optical characteristics measuring system 200 shown in FIG. 1 may not include the spectrometer 13.

There is demand for technology that makes it possible to acquire more preferable measurement results, with a configuration for measuring optical characteristics of a subject, such as the light distribution characteristics measuring apparatus disclosed in Patent Document 1, using captured images of the subject.

Considering this demand, with the optical characteristics measuring method according to the embodiment of the present invention, the information processing apparatus 10 first acquires one or more captured images including the subject S, using an image capturing apparatus 31 that is located at a predetermined distance from the subject S, and is configured to be displaceable relative to the subject S, while maintaining the predetermined distance. Next, based on the one or more captured images thus acquired, the information processing apparatus 10 creates one or more virtual images including the subject S and acquired from one or more analysis points Ap each located at a position other than a position on the spherical plane Sp that includes the trajectory of the image capturing apparatus 31.

The inventors of the present invention have conceived of measuring light that reaches the analysis points Ap, from the viewpoint of what captured images can be acquired if images of the subject S are captured from the analysis points Ap, instead of simply measuring the intensity of light from the subject S, at the analysis points Ap. As described above, with the method of creating a virtual image from the analysis points AP using an image captured from a point located at a position other than the analysis points Ap, it is possible to reliably acquire a larger amount of information at various analysis points Ap, compared to a method of simply measuring the intensity of light from the subject S at an analysis point Ap. Therefore, it is possible to acquire more preferable measurement results, with a configuration for measuring optical characteristics of the subject S by using one or more captured images of the subject S.

Also, with the above-described method, it is unnecessary to position the image capturing apparatus 31 at an actual analysis point Ap. Therefore, even if the analysis point Ap is remote from the subject S, it is possible to reduce the distance from the subject S to the image capturing apparatus, and it is possible to downsize the overall system.

Also, with the optical characteristics measuring method according to the embodiment of the present invention, when creating a virtual image, the information processing apparatus 10 creates a plurality of virtual images acquired from a plurality of analysis points Ap, respectively. Furthermore, the information processing apparatus 10 calculates the sum of pixel values of each of the plurality of virtual images thus created.

With such a method, it is possible to calculate the light intensity for each analysis point Ap. Therefore, it is possible to acquire the distribution of intensities of light on any plane with high accuracy.

Also, with the optical characteristics measuring method according to the embodiment of the present invention, when creating a virtual image, the information processing apparatus 10 selects a captured image from among a plurality of images captured from the trajectory L, based on a position on the virtual plane Vp corresponding to the virtual image, the position of the analysis point Ap, and the spherical plane Sp, and creates the virtual image based on the captured image thus selected.

With such a method, it is possible to select an appropriate captured image for each position on the virtual plane Vp according to the position on the virtual plane Vp, the position of the analysis point Ap, and the trajectory L. Therefore, it is possible to create a virtual image with high accuracy.

Also, with the optical characteristics measuring method according to the embodiment of the present invention, when creating a virtual image, the information processing apparatus 10 selects a plurality of captured images from among a plurality of images captured from the trajectory L, and creates a virtual image based on one image created from the plurality of captured images thus selected.

With such a method, in a case where there is no captured image corresponding to a position on the virtual plane Vp and the position of the analysis point Ap, and captured from the trajectory L, it is possible to select a plurality of appropriate images and create a virtual image with high accuracy.

Also, with the optical characteristics measuring method according to the embodiment of the present invention, when acquiring one or more captured images, the information processing apparatus 10 uses a plurality of image capturing apparatuses 31 that respectively capture images with different wavelengths, and when creating a virtual image, the information processing apparatus 10 creates a virtual image for each of the image capturing apparatuses 31.

With such a method, it is possible to acquire a plurality of captured images with a plurality of wavelengths, captured at the same time, for example. Also, it is possible to acquire captured images with different wavelengths in parallel and shorten the image capturing period. Therefore, even if the intensity of light from the subject S changes over time, it is possible to acquire preferable captured images without being significantly affected by such changes.

Also, with the optical characteristics measuring method according to the embodiment of the present invention, when acquiring one or more captured images, the information processing apparatus 10 uses a plurality of image capturing apparatuses 31 that are arranged along the circumference of the same circle that is centered around the subject S.

In this way, by arranging a plurality of image capturing apparatuses 31 such that the distance between each image capturing apparatus 31 and the subject S is the same, it is possible to simplify computation processing when, for example, performing analysis using a plurality of virtual images respectively created for the plurality of image capturing apparatuses 31.

Also, with the optical characteristics measuring method according to the embodiment of the present invention, when acquiring one or more captured images, the information processing apparatus 10 uses a plurality of image capturing apparatuses 31 that include light attenuation filters 43A, 43B, and 43C that are provided at positions in the image capturing direction.

With such a method, even if the light-transmission rates of the plurality of optical filters 42A, 42B, and 42C respectively provided in the plurality of image capturing apparatuses 31 are different from each other, each image capturing apparatus 31 can capture an image with an appropriate light intensity.

Also, in the optical characteristics measuring system 200 according to the embodiment of the present invention, an image capturing apparatus 31 is located at a predetermined distance from the subject S. The movable mechanism 12 is configured to be able to change the position of the image capturing apparatus 31 relative to the subject S while maintaining the predetermined distance. Based on an image captured by the image capturing apparatus 31 and including the subject S, the information processing apparatus 10 can create a virtual image including the subject S and acquired from one or more analysis points Ap each located at a position other than a position on the spherical plane Sp that includes the trajectories L of the image capturing apparatuses 31.

The inventors of the present invention have conceived of measuring light that reaches the analysis points Ap, from the viewpoint of what captured images can be acquired if images of the subject S are captured from the analysis points Ap, instead of simply measuring the intensity of light from the subject S, at the analysis points Ap. As described above, with a configuration that uses an image captured from a point located at a position other than the analysis points Ap and is thereby able to create a virtual image acquired from the analysis point, it is possible to reliably acquire a larger amount of information at various analysis points Ap, compared to a configuration that simply measures the intensity of light from the subject S at an analysis point Ap. Therefore, it is possible to acquire more preferable measurement results, with a configuration for measuring optical characteristics of the subject S by using captured images of the subject S.

Also, with the above-described configuration, it is unnecessary to position the image capturing apparatus 31 at an actual analysis point Ap. Therefore, even if the analysis point Ap is remote from the subject S, it is possible to reduce the distance from the subject S to the image capturing apparatus, and it is possible to downsize the overall system.

Also, in the optical characteristics measuring system 200 according to the embodiment of the present invention, the information processing apparatus 10 creates a plurality of virtual images acquired from a plurality of analysis points Ap respectively, and calculates the sum of pixel values of each of the plurality of virtual images thus created.

With such a configuration, it is possible to calculate the light intensity for each analysis point Ap. Therefore, it is possible to acquire the distribution of intensities of light on any plane with high accuracy.

Also, in the optical characteristics measuring system 200 according to the embodiment of the present invention, the information processing apparatus 10 selects a captured image from among a plurality of images captured from the trajectory L, based on a position on the virtual plane Vp corresponding to the virtual image, the position of the analysis point Ap, and the spherical plane Sp, and creates the virtual image based on the captured image thus selected.

With such a configuration, it is possible to select an appropriate captured image for each position on the virtual plane Vp according to the position on the virtual plane Vp, the position of the analysis point Ap, and the trajectory L. Therefore, it is possible to create a virtual image with high accuracy.

Also, in the optical characteristics measuring system 200 according to the embodiment of the present invention, the information processing apparatus 10 selects a plurality of captured images from among a plurality of images captured from the trajectory L of the image capturing apparatus 31, and creates a virtual image based on one image created from the plurality of captured images thus selected.

With such a configuration, in a case where there is no captured image corresponding to a position on the virtual plane Vp and the position of the analysis point Ap, and captured from the trajectory L, it is possible to select a plurality of appropriate images and create a virtual image with high accuracy.

Also, in the optical characteristics measuring system 200 according to the embodiment of the present invention, a plurality of image capturing apparatuses 31 respectively capture images with different wavelengths. Also, the information processing apparatus 10 creates a virtual image for each of the image capturing apparatuses 31.

With such a configuration, it is possible to acquire a plurality of captured images with a plurality of wavelengths, captured at the same time, for example. Also, it is possible to acquire captured images with different wavelengths in parallel and shorten the image capturing period. Therefore, even if the intensity of light from the subject S changes over time, it is possible to acquire preferable captured images without being significantly affected by such changes.

Also, in the optical characteristics measuring system 200 according to the embodiment of the present invention, the image capturing apparatuses 31 are arranged along the circumference of the same circle that is centered around the subject S.

In this way, with a configuration in which a plurality of image capturing apparatuses 31 are arranged such that the distance between each image capturing apparatus 31 and the subject S is the same, it is possible to simplify computation processing when, for example, performing analysis using a plurality of virtual images respectively created for the plurality of image capturing apparatuses 31.

Also, in the optical characteristics measuring system 200 according to the embodiment of the present invention, the image capturing apparatuses 31A, 31B, and 31C respectively include light attenuation filters 43A, 43B, and 43C that are provided at positions in the image capturing direction.

With such a configuration, even if the light-transmission rates of the plurality of optical filters 42A, 42B, and 42C respectively provided in the plurality of image capturing apparatuses 31 are different from each other, each image capturing apparatus 31 can capture an image with an appropriate light intensity.

First Modification

Figure 15:
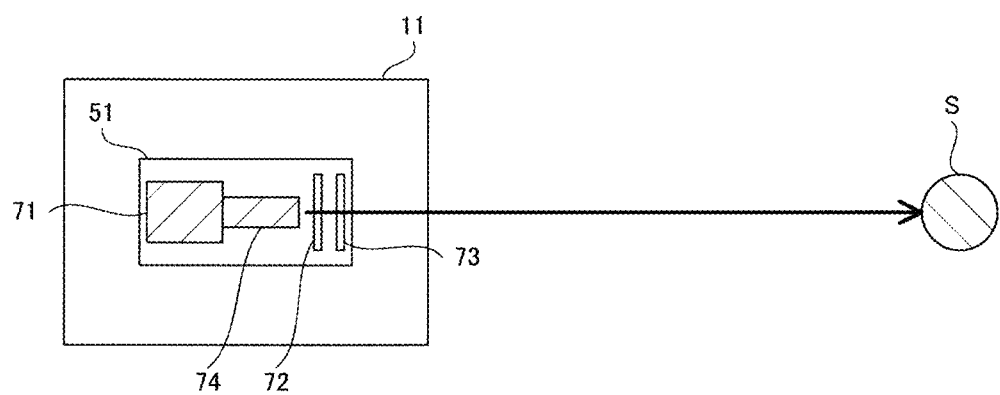
FIG. 15 shows a configuration of a first modification of the detector unit according to the embodiment of the present invention.

FIG. 15 shows a configuration of a first modification of the detector unit according to the embodiment of the present invention.

In the above-described example, the detector unit 11 includes three image capturing apparatuses 31A, 31B, and 31C. In contrast, as shown in FIG. 15, the first modification of the detector unit 11 includes one image capturing apparatus 51. The image capturing apparatus 51 includes a camera 71, an optical filter unit 72 that is provided at a position in the image capturing direction, and a light attenuation filter unit 73 that is provided at a position in the image capturing direction.

Figure 16:
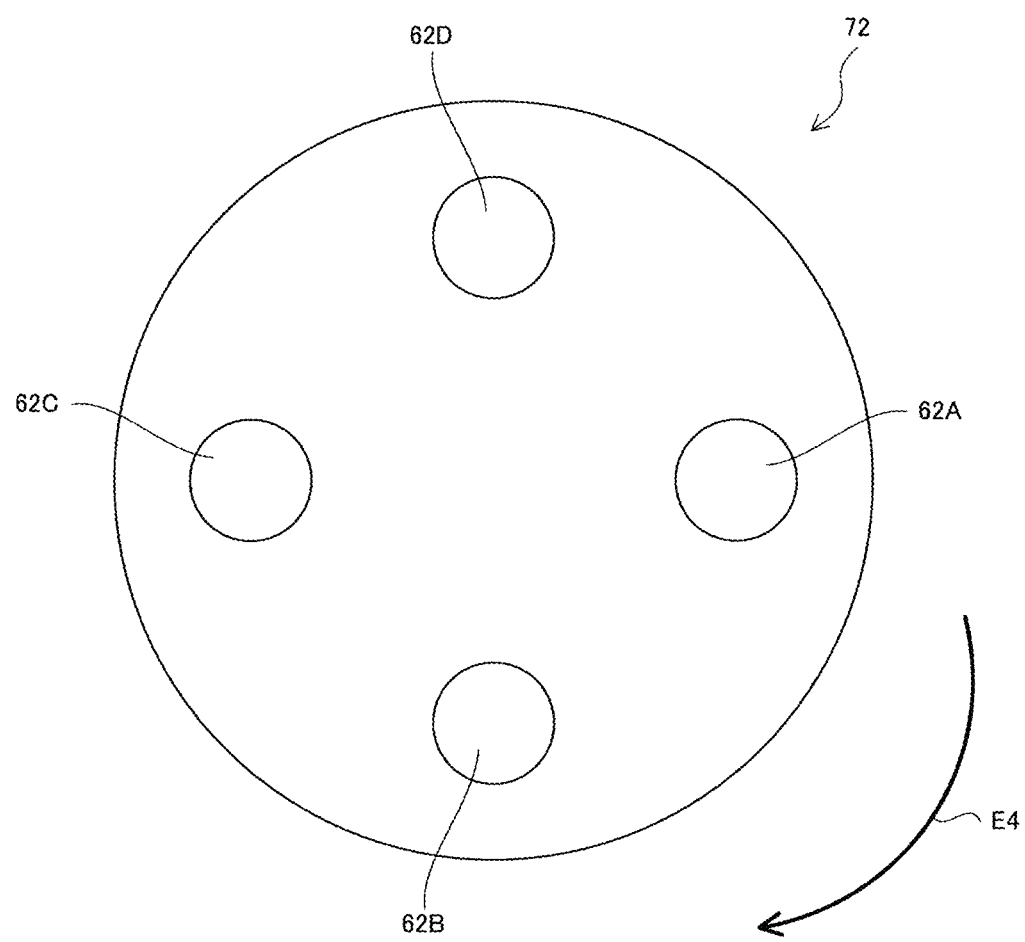
FIG. 16 shows a configuration of an optical filter unit included in the first modification of the detector unit.

FIG. 16 shows a configuration of the optical filter unit included in the first modification of the detector unit.

As shown in FIG. 16, the optical filter unit 72 includes, for example, three optical filters 62A, 62B, and 62C, and an opening 62D. The optical filters 62A, 62B, and 62C respectively allow light with different wavelengths to pass therethrough. For example, the optical filter 62A allows light with a wavelength corresponding to the color red to pass therethrough, the optical filter 62B allows light with a wavelength corresponding to the color green to pass therethrough, and the optical filter 62C allows light with a wavelength corresponding to the color blue to pass therethrough. Note that the optical filters 62A, 62B, and 62C do not necessarily have characteristics that allow visible light to pass therethrough, and may have characteristics that allow infrared or ultraviolet light to pass therethrough.

Figure 17:
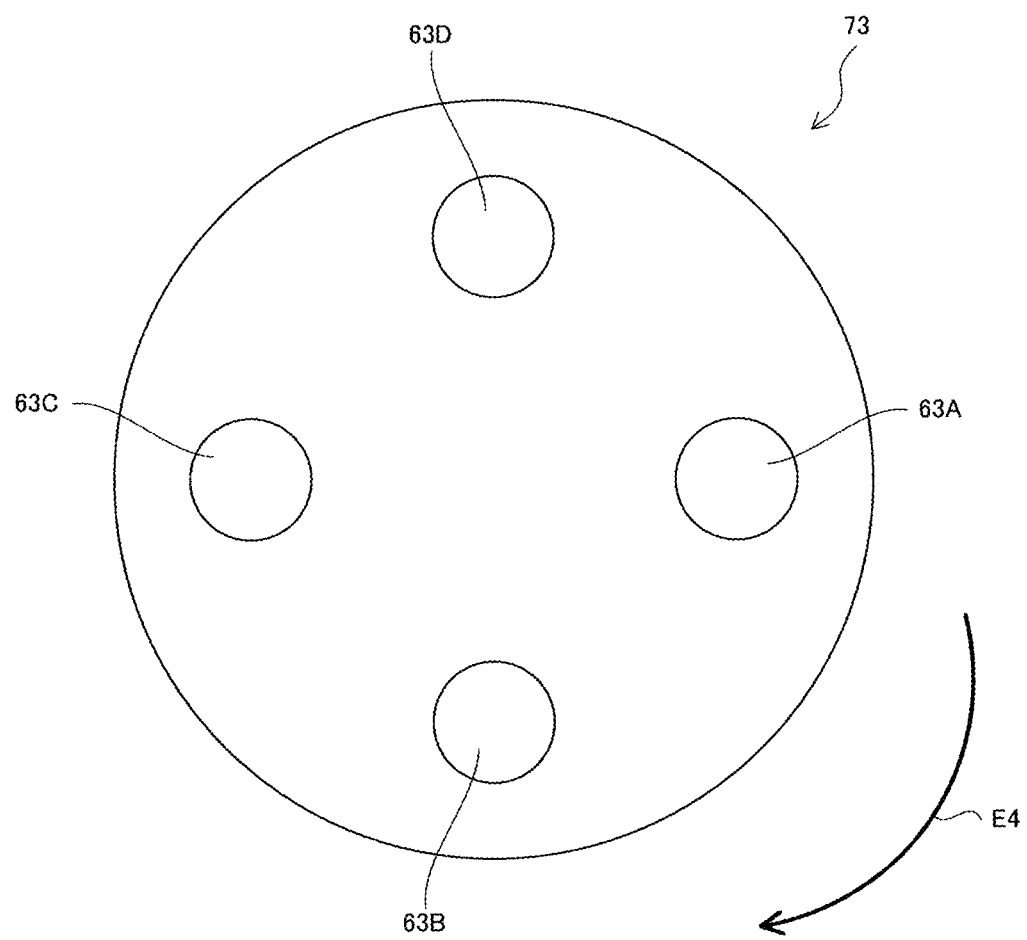
FIG. 17 shows a configuration of a light attenuation filter unit included in the first modification of the detector unit.

FIG. 17 shows a configuration of a light attenuation filter unit included in the first modification of the detector unit.

As shown in FIG. 17, the light attenuation filter unit 73 includes, for example, three light attenuation filters 63A, 63B, and 63C, and an opening 63D. The three light attenuation filters 63A, 63B, and 63C are respectively provided in correspondence with the optical filters 62A, 62B, and 62C, and adjust the amount of light such that light of an appropriate intensity reaches the optical filters 62A, 62B, and 62C corresponding thereto.

The optical filter unit 72 and the light attenuation filter unit 73 are connected to a motor (not shown), for example.

The information processing apparatus 10 shown in FIG. 1 transmits a drive command to the motor via a LAN according to a user operation, for example. Upon receiving the drive command from the information processing apparatus 10, the motor pivots according to the drive command. As a result of the motor pivoting, the optical filter unit 72 and the light attenuation filter unit 73 integrally pivot in a direction indicated by an arrow E4.

As a result of the optical filter unit 72 pivoting, one of the optical filters 62A, 62B, and 62C and the opening 62D is positioned in front of a lens 74 of a camera 71.

Also, the light attenuation filter unit 73 pivots such that the light attenuation filter 63A is positioned in front of the lens 74 when the optical filter 62A is positioned in front of the lens 74.

Also, the light attenuation filter unit 73 pivots such that the light attenuation filter 63B is positioned in front of the lens 74 when the optical filter 62B is positioned in front of the lens 74. Also, the light attenuation filter unit 73 pivots such that the light attenuation filter 63C is positioned in front of the lens 74 when the optical filter 62C is positioned in front of the lens 74.

For example, in a state where the optical filter 62A is positioned in front of the lens 74, the information processing apparatus 10 transmits an image capture command to the image capturing apparatus 51 while rotating the first motor 23 and the second motor 24 shown in FIG. 1. As a result, the information processing apparatus 10 acquires a plurality of captured images including the subject S at the center and corresponding to the color red.

Also, for example, in a state where the optical filter 62B is positioned in front of the lens 74, the information processing apparatus 10 transmits an image capture command to the image capturing apparatus 51 while rotating the first motor 23 and the second motor 24. As a result, the information processing apparatus 10 acquires a plurality of captured images including the subject S at the center and corresponding to the color green.

Also, for example, in a state where the optical filter 62C is positioned in front of the lens 74, the information processing apparatus 10 transmits an image capture command to the image capturing apparatus 51 while rotating the first motor 23 and the second motor 24. As a result, the information processing apparatus 10 acquires a plurality of captured images including the subject S at the center and corresponding to the color blue.

With such a configuration in which the optical filter unit 72 and the light attenuation filter unit 73 are provided, it is possible to acquire various kinds of captured images without providing a plurality of image capturing apparatuses 51, and therefore it is possible to reduce costs.

Other configurations and operations are the same as those of the above-described optical characteristics measuring system 200, detailed descriptions are not repeated here.

Second Modification

The example above illustrates a case where images captured by the image capturing apparatuses 31 include the subject S at the centers of the captured images. However, the position of the subject S in a captured image may be displaced from the center of the captured image. Considering such a case, a second modification of the information processing apparatus 10 can correct positional information indicating the position of each pixel of a captured image.

For example, the information processing apparatus 10 acquires, in advance, for each image capturing apparatuses 31, a correction value for correcting positional information. Specifically, a correction value indicates a displacement between the position of the pixel in which the center of the subject S is captured in a captured image and the position of the pixel at the center of the captured image.

For example, when acquiring an image captured by the image capturing apparatus 31A (step S12 shown in FIG. 14), the information processing apparatus 10 corrects positional information such that the position of each pixel of the captured image is displaced by an amount indicated by a correction value corresponding to the image capturing apparatus 31A.

The same correction is performed on an image captured by the image capturing apparatus 31B and an image captured by the image capturing apparatus 31C. Thereafter, the information processing apparatus 10 performs computation based on the corrected positional information in step S13 and the subsequent steps shown in FIG. 14.

Specifically, in contrast to a configuration with which positional information is not corrected, the second modification of the information processing apparatus 10 specifies, in a captured image that has been selected or created, the pixel value of a pixel that is displaced by an amount indicated by the correction value corresponding to the image capturing apparatus 31 (step S19 shown in FIG. 14).

In this way, with the optical characteristics measuring method according to the embodiment of the present invention, when acquiring one or more captured images, the information processing apparatus 10 corrects positional information that indicates the positions of the pixels of one or more images captured by each of the plurality of image capturing apparatuses 31.

With such a method, even if the position of the subject S is different in each of the images captured by the plurality of image capturing apparatuses 31, it is possible to perform correction such that the position of the subject S in each captured image is the same, and then generate a virtual image for each wavelength. Therefore, it is possible to acquire even more preferable measurement results.

Also, in the optical characteristics measuring system 200 according to the embodiment of the present invention, the information processing apparatus 10 can correct positional information indicating the position of each pixel of one or more images captured by a plurality of image capturing apparatuses 31.

With such a configuration, even if the position of the subject S is different in each of the images captured by the plurality of image capturing apparatuses 31, it is possible to perform correction such that the position of the subject S in each captured image is the same, and then generate a virtual image for each wavelength. Therefore, it is possible to acquire more preferable measurement results.

Other configurations and operations are the same as those of the above-described optical characteristics measuring system 200, detailed descriptions are not repeated here.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An optical characteristics measuring method for measuring optical characteristics of a subject, the optical characteristics measuring method comprising:
   a step of acquiring, by an information processing device, one or more captured images including the subject, using an image capturing apparatus that is located at a predetermined distance from the subject, and is configured to be displaceable relative to the subject, while maintaining the predetermined distance; and a step of creating, by the information processing device, based on the one or more captured images thus acquired, a virtual image including the subject and acquired from one or more analysis points each located at a position other than a position on a plane that includes the trajectory of the image capturing apparatus, wherein, in the step of creating a virtual image, a captured image is selected from among a plurality of images captured from the trajectory, based on a position on a virtual plane corresponding to the virtual image, the position of each of the one or more analysis points, and the plane, and the virtual image is created based on the captured image thus selected.

2. The optical characteristics measuring method according to claim 1, wherein, in the step of creating a virtual image, a plurality of virtual images acquired from a plurality of analysis points are respectively created, and the optical characteristics measuring method further comprises a step of calculating, by the information processing device, the sum of pixel values of each of the plurality of virtual images thus created.

3. The optical characteristics measuring method according to claim 1, wherein, in the step of creating a virtual image, a plurality of captured images are selected from among a plurality of images captured from the trajectory, and the virtual image is created based on one image created from the plurality of captured images thus selected.

4. The optical characteristics measuring method according to claim 1, wherein, in the step of acquiring one or more captured images, a plurality of image capturing apparatuses that respectively capture images with different wavelengths are used, and in the step of creating a virtual image, the virtual image is created for each of the plurality of image capturing apparatuses.

5. The optical characteristics measuring method according to claim 4, wherein, in the step of acquiring one or more captured images, a plurality of image capturing apparatuses that are arranged along the circumference of the same circle that is centered around the subject are used.

6. The optical characteristics measuring method according to claim 4, wherein, in the step of acquiring one or more captured images, positional information indicating the position of each pixel of the one or more images captured by the plurality of image capturing apparatuses is corrected.

7. The optical characteristics measuring method according to claim 4, wherein, in the step of acquiring one or more captured images, a plurality of image capturing apparatuses that respectively include light attenuation filters provided at positions in an image capturing direction are used.

8. An optical characteristics measuring system that measures optical characteristics of a subject, the optical characteristics measuring system comprising:

an information processing apparatus;

an image capturing apparatus that is located at a predetermined distance from the subject; and a movable mechanism configured to be able to change the position of the image capturing apparatus relative to the subject while maintaining the predetermined distance, wherein the information processing apparatus is configured to create a virtual image including the subject and acquired from one or more analysis points each located at a position other than a position on a plane that includes the trajectory of the image capturing apparatus, based on an image captured by the image capturing apparatus and including the subject, and the information processing apparatus is configured to select a captured image from among a plurality of images captured from the trajectory, based on a position on a virtual plane corresponding to the virtual image, the position of each of the one or more analysis points, and the plane, and create the virtual image based on the captured image thus selected.

9. The optical characteristics measuring system according to claim 8, wherein the information processing apparatus is configured to create a plurality of virtual images acquired from a plurality of analysis points respectively, and calculate the sum of pixel values of each of the plurality of virtual images thus created.

\* \* \* \* \*